(12) United States Patent
Ikebata

(10) Patent No.: US 12,343,642 B2
(45) Date of Patent: Jul. 1, 2025

(54) NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

(71) Applicant: NINTENDO CO., LTD., Kyoto (JP)

(72) Inventor: Yoshihito Ikebata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 392 days.

(21) Appl. No.: 18/148,727

(22) Filed: Dec. 30, 2022

(65) Prior Publication Data

US 2023/0241506 A1  Aug. 3, 2023

(30) Foreign Application Priority Data

Jan. 31, 2022  (JP) ................. 2022-013377

(51) Int. Cl.
*A63F 13/812* (2014.01)
*A63F 13/42* (2014.01)
(Continued)

(52) U.S. Cl.
CPC ............ *A63F 13/812* (2014.09); *A63F 13/42* (2014.09); *A63F 13/44* (2014.09); *A63F 13/537* (2014.09); *A63F 13/56* (2014.09); *A63F 13/573* (2014.09); *A63F 13/577* (2014.09); *A63F 13/422* (2014.09); *A63F 13/45* (2014.09); *A63F 13/828* (2014.09); *A63F 2300/6045* (2013.01); *A63F 2300/6054* (2013.01); *A63F 2300/64* (2013.01);
(Continued)

(58) Field of Classification Search
CPC ........ A63F 13/812; A63F 13/42; A63F 13/44; A63F 13/537; A63F 13/56; A63F 13/573; A63F 13/577; A63F 13/422; A63F 13/45; A63F 13/828; A63F 2300/6045; A63F 2300/6054; A63F 2300/64; A63F 2300/6607; A63F 2300/8011
See application file for complete search history.

(56) References Cited

U.S. PATENT DOCUMENTS 6,149,520 A * 11/2000 Takatsuka ............. A63F 13/422
                                                    273/108.1
6,196,917 B1 * 3/2001 Mathias ................ A63F 13/812
                                                    463/2
(Continued)

FOREIGN PATENT DOCUMENTS

JP    H10113471 A   5/1998
JP    6945132 B1    10/2021

OTHER PUBLICATIONS

Notice of Reasons for Refusal dated Sep. 5, 2023 received in Japanese Patent Application No. JP 2022-013377.

*Primary Examiner* — William H McCulloch, Jr.
(74) *Attorney, Agent, or Firm* — Scully, Scott, Murphy & Presser, P.C.

(57) ABSTRACT

When, on the basis of an operation input by a user, due to a predetermined action by an operation character of a first team, the operation character has collided with a teammate character of the first team, the teammate character is moved in a collision direction. When the teammate character having been moved in the collision direction has collided with an opponent character, the opponent character is stopped or moved in a collision direction.

30 Claims, 17 Drawing Sheets

(51) Int. Cl.
*A63F 13/44* (2014.01)
*A63F 13/537* (2014.01)
*A63F 13/56* (2014.01)
*A63F 13/573* (2014.01)
*A63F 13/577* (2014.01)
*A63F 13/422* (2014.01)
*A63F 13/45* (2014.01)
*A63F 13/828* (2014.01)

(52) U.S. Cl.
CPC ............... *A63F 2300/6607* (2013.01); *A63F 2300/8011* (2013.01)

(56) References Cited

U.S. PATENT DOCUMENTS

| | | | | |
|---|---|---|---|---|
| 6,280,323 B1* | 8/2001 | Yamazaki | ........... | A63F 13/5255 463/31 |
| 6,736,724 B1* | 5/2004 | Erikawa | ........... | A63F 13/10 463/32 |
| 7,252,588 B2* | 8/2007 | Takemoto | ........... | A63F 13/245 463/2 |
| 7,708,641 B2* | 5/2010 | Tawara | ........... | A63F 13/45 463/31 |
| 8,287,369 B2* | 10/2012 | Mori | ........... | A63F 13/422 463/31 |
| 8,597,094 B2* | 12/2013 | Taya | ........... | A63F 13/10 463/9 |
| 8,616,946 B2* | 12/2013 | Yanagisawa | ........... | A63F 13/56 463/31 |
| 8,715,049 B2* | 5/2014 | Yanagihara | ........... | A63F 13/812 463/7 |
| 9,095,777 B2* | 8/2015 | Kondo | ........... | A63F 13/218 |
| 9,421,469 B2* | 8/2016 | Tsunashima | ........... | A63F 13/44 |
| 9,616,332 B2* | 4/2017 | Fujishiro | ........... | A63F 13/211 |
| 11,389,724 B2* | 7/2022 | Takafuji | ........... | A63F 13/46 |
| 11,878,247 B2* | 1/2024 | Tatsuta | ........... | A63F 13/56 |
| 2010/0178968 A1* | 7/2010 | Mori | ........... | A63F 13/30 463/9 |
| 2010/0240429 A1* | 9/2010 | Chosogabe | ........... | A63F 13/56 463/43 |
| 2010/0267435 A1* | 10/2010 | Taya | ........... | A63F 13/45 463/2 |
| 2012/0169592 A1* | 7/2012 | Kondo | ........... | A63F 13/42 345/156 |
| 2023/0241506 A1* | 8/2023 | Ikebata | ........... | A63F 13/577 463/31 |
| 2023/0256337 A1* | 8/2023 | Tatsuta | ........... | A63F 13/358 463/31 |

* cited by examiner

FIG. 3  TACKLE OPERATION AND BEHAVIOR OF OPERATION CHARACTER

| BUTTON OPERATION (TACKLE OPERATION) | TAP (LESS THAN 0.1 SECONDS) | FIRST LONG PRESS (NOT LESS THAN 0.1 SECONDS AND LESS THAN 1.0 SECOND) | SECOND LONG PRESS (NOT LESS THAN 1.0 SECOND) |
|---|---|---|---|
| TACKLE GAUGE FILLED DEGREE |  | 1 | 2 |
| TACKLE GAUGE DISPLAY MODE | NOT DISPLAYED | ›› (70) | ›› (70) |
| TACKLE STRENGTH | 1 | 2 | 3 |
| MOVEMENT DISTANCE OF TACKLE (METER) | 1 | 2 | 3 |

FIG. 4  ABILITY PARAMETER

|  | PHYSICAL | MOVEMENT SPEED | SHOOTING ABILITY | PASS ACCURACY | TECHNIQUE |
|---|---|---|---|---|---|
| CHARACTER A | 3 | 1 | 3 | 2 | 2 |
| CHARACTER B | 1 | 3 | 2 | 1 | 3 |
| CHARACTER C | 2 | 2 | 1 | 2 | 2 |
| CHARACTER D | 3 | 1 | 2 | 3 | 2 |
| CHARACTER a | 2 | 2 | 1 | 2 | 2 |
| ⋮ | ⋮ | ⋮ | ⋮ | ⋮ | ⋮ |

FIG. 5

BEHAVIOR OF OPPONENT CHARACTER ON WHICH ORDINARY TACKLE HAS BEEN PERFORMED

| TACKLE STRENGTH | 1 | | | 2 | | | 3 | | |
|---|---|---|---|---|---|---|---|---|---|
| VALUE OF PHYSICAL OF OPPONENT CHARACTER | 3 | 2 | 1 | 3 | 2 | 1 | 3 | 2 | 1 |
| DISTANCE BY WHICH OPPONENT CHARACTER ON WHICH ORDINARY TACKLE HAS BEEN PERFORMED IS SENT FLYING (METER) | 0 | 0 | 1 | 0 | 1 | 2 | 1 | 2 | 3 |

FIG. 6

BEHAVIOR OF TACKLED TEAMMATE CHARACTER AND BEHAVIOR OF OPPONENT CHARACTER ON WHICH TEAM TACKLE HAS BEEN PERFORMED

| TACKLE STRENGTH | 1 | | | 2 | | | 3 | | |
|---|---|---|---|---|---|---|---|---|---|
| MOVEMENT DISTANCE OF TACKLED TEAMMATE CHARACTER (METER) | 2 (KEEPING THE BALL: 4) | | | 4 (KEEPING THE BALL: 8) | | | 6 (KEEPING THE BALL: 12) | | |
| VALUE OF PHYSICAL OF OPPONENT CHARACTER ON WHICH TEAM TACKLE HAS BEEN PERFORMED | 3 | 2 | 1 | 3 | 2 | 1 | 3 | 2 | 1 |
| DISTANCE BY WHICH OPPONENT CHARACTER ON WHICH TEAM TACKLE HAS BEEN PERFORMED IS SENT FLYING (METER) | 0 | 1 | 2 | 3 | 4 | 5 | 6 | 7 | 8 |

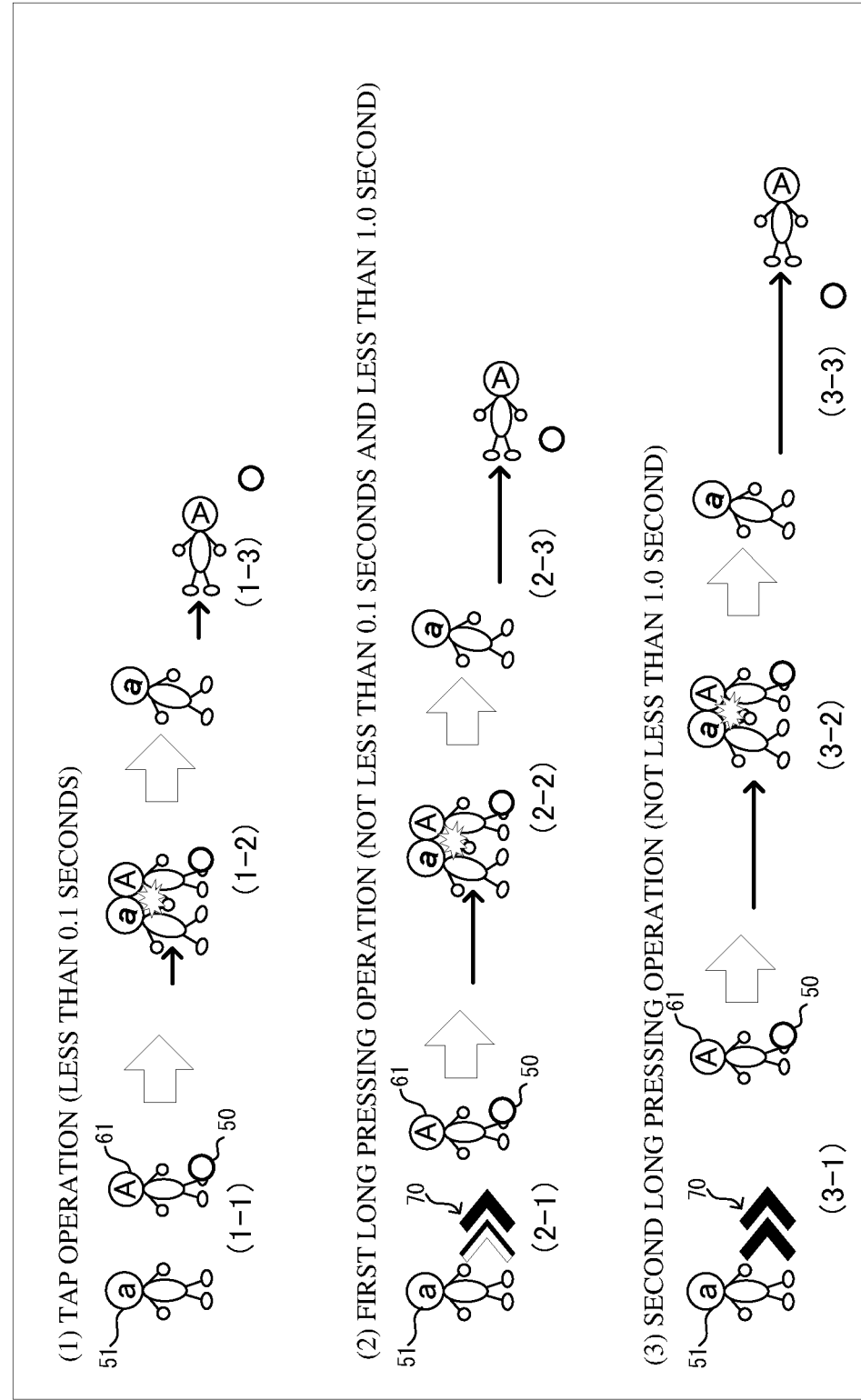

(1) TAP OPERATION (LESS THAN 0.1 SECONDS)

(2) FIRST LONG PRESSING OPERATION (NOT LESS THAN 0.1 SECONDS AND LESS THAN 0.5 SECONDS)

(3) SECOND LONG PRESSING OPERATION (NOT LESS THAN 0.5 SECONDS AND LESS THAN 1.0 SECOND)

(4) THIRD LONG PRESSING OPERATION (NOT LESS THAN 1.0 SECOND)

FIG. 12

GOAL SUCCESS PROBABILITY OF SUPER SHOT

| SECOND-TIME BUTTON-PRESSING RESULT | WHITE WHITE | WHITE YELLOW/ YELLOW WHITE | WHITE BLUE/ BLUE WHITE | YELLOW YELLOW | YELLOW BLUE/ BLUE YELLOW | BLUE BLUE |
|---|---|---|---|---|---|---|
| GOAL SUCCESS PROBABILITY | 5% | 20% | 40% | 50% | 80% | 100% |

NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2022-013377 filed on Jan. 31, 2022, the entire contents of which are incorporated herein by reference.

FIELD

The present disclosure relates to processing of a competitive sports game in which teams compete against each other.

BACKGROUND AND SUMMARY

To date, a game apparatus in which a sports game being a ball game is played between an operation target team of a user and a competitive opponent team, has been known.

The sports game in the game apparatus above discloses a play in which an athlete character of one team performs a predetermined action against an athlete character of an opponent team, to take a ball. However, this action is directed to a play in which the athlete character forcibly takes the ball from an opponent team athlete keeping the ball, and does not have an effect on a teammate athlete character in particular.

Therefore, an object of an exemplary embodiment is to provide: a non-transitory computer-readable storage medium having stored therein a game program that can realize a novel action in which, in a sports game in which a character of a first team being an operation target of a user and a character of a second team of a competitive opponent compete against each other, a teammate character that belongs to the first team and that the operation character belonging to the first team has collided with, is caused to further collide with an opponent character belonging to the second team; a game processing system; a game processing apparatus; and a game processing method.

Configuration examples for achieving the above object will be shown below.

A configuration example is a non-transitory computer-readable storage medium having stored therein instructions that, when executed by a processor of an information processing apparatus that executes a competitive sports game in which a character belonging to a first team and being an operation target of a user, and a character belonging to a second team of a competitive opponent are controlled in a virtual space so as to put a predetermined object into a goal, cause the information processing apparatus to: on the basis of an operation input by the user, perform an action occurrence process of causing an operation character belonging to the first team to perform a predetermined action; when, due to the predetermined action, the operation character has collided with an opponent character belonging to the second team, perform a first collision process of stopping the opponent character or moving the opponent character in a collision direction; when, due to the predetermined action, the operation character has collided with a teammate character belonging to the first team, perform a second collision process of moving the teammate character in a collision direction; and when, due to the second collision process, the teammate character having been moved in the collision direction has further collided with the opponent character, perform a third collision process of stopping the opponent character or moving the opponent character in a collision direction.

According to the above configuration example, it is possible to realize a novel action in which a teammate character that the operation character has collided with is further caused to collide with an opponent character.

In another configuration example, the instructions may cause the information processing apparatus to, when, in the first collision process, due to the predetermined action, the operation character has collided with the opponent character possessing the predetermined object, cause the operation character to take the predetermined object from the opponent character, or cause the opponent character to cancel the possessing of the predetermined object.

According to the above configuration example, it is possible to realize an action of, for example, taking the predetermined object from the opponent character through collision.

In another configuration example, the instructions may cause the information processing apparatus to, when, in the third collision process, due to the predetermined action, the teammate character has collided with the opponent character possessing the predetermined object, cause the teammate character to take the predetermined object from the opponent character, or cause the opponent character to cancel the possessing of the predetermined object.

According to the above configuration example, in a novel action in which the teammate character that the operation character has collided with is further caused to collide with the opponent character, the teammate character can, for example, take the predetermined object from the opponent character through collision.

In another configuration example, the instructions may cause the information processing apparatus to, when, in the second collision process, due to the predetermined action, the operation character has collided with the teammate character possessing the predetermined object, move the teammate character in the collision direction, with an additional movement speed applied to the teammate character.

According to the above configuration example, since the teammate character possessing the predetermined object is accelerated due to collision, a novel motion of, for example, breaking through the defense of the opponent character can be realized, and a competitive sports game that is rich in strategic characteristics is realized.

In another configuration example, the instructions may cause the information processing apparatus to, when, in the first collision process, the operation character has collided with the opponent character not possessing the predetermined object, or when, in the third collision process, the teammate character moving in the collision direction has collided with the opponent character not possessing the predetermined object, cause a first item advantageous for the second team to appear in the virtual space.

According to the above configuration example, when the operation character or the teammate character is caused to collide with the opponent character not possessing the predetermined object, a first item advantageous for the second team appears in the virtual space. Therefore, the range for selection as to whether to perform a predetermined action on the opponent character not possessing the predetermined object is widened. Thus, a competitive sports game that is rich in strategic characteristics is realized.

In another configuration example, the instructions may cause the information processing apparatus to cause a second item usable by both of the first team and the second team to appear in the virtual space.

According to the above configuration example, a second item usable by both teams also appears, and thus, a competitive sports game that is rich in strategic characteristics is realized.

In another configuration example, the instructions may cause the information processing apparatus to: during the competitive sports game, in accordance with an ability parameter set to each character belonging to the first team and each character belonging to the second team, control the character belonging to the first team and the character belonging to the second team; and in the first collision process or the third collision process, in accordance with at least the ability parameter of the opponent character, determine whether to stop the opponent character or move the opponent character in a collision direction.

According to the above configuration example, the behavior of the opponent character that has been subjected to collision changes in accordance with an ability parameter, and thus, a competitive sports game that is rich in strategic characteristics is realized.

In another configuration example, the ability parameter may be different for each character belonging to the first team and for each character belonging to the second team.

According to the above configuration example, since the behavior of each character having been subjected to collision changes, a wide variety of play can be realized through selection of a character, and thus, a competitive sports game that is rich in strategic characteristics is realized.

In another configuration example, the instructions may cause the information processing apparatus to, on the basis of an operation input by the user, cause the opponent character to be equipped with an equipment item that changes the ability parameter.

According to the above configuration example, since the behavior of the character when having been subjected to collision can be changed by changing the ability parameter on the basis of the equipment item, a wide variety of play can be realized through selection of the equipment item, and thus, a competitive sports game that is rich in strategic characteristics is realized.

In another configuration example, the instructions may cause the information processing apparatus to, when, in the first collision process or the third collision process, the opponent character is moved in the collision direction, move the opponent character in the collision direction by a movement distance according to the ability parameter.

According to the above configuration example, since the movement distance of the opponent character changes in accordance with the ability parameter of the opponent character having been subjected to collision, a wide variety of play in the game can be realized. Thus, a competitive sports game that is rich in strategic characteristics is realized.

In another configuration example, the instructions may cause the information processing apparatus to: in the predetermined action, determine a strength of collision to be applied by the operation character to the teammate character or the opponent character, in accordance with a retaining degree of a first retaining input based on an operation input by the user; and when, in the first collision process, the operation character has collided with the opponent character or when, in the second collision process, the operation character has collided with the teammate character, move the opponent character or the teammate character in the collision direction by a movement distance according to the retaining degree of the first retaining input.

According to the above configuration example, the opponent character or the teammate character moves in the collision direction by a movement distance according to the retaining degree of the first retaining input. Thus, a competitive sports game that is rich in strategic characteristics is realized.

In another configuration example, the instructions may cause the information processing apparatus to, while the first retaining input is performed, generate a game image including a first gauge that indicates a degree of the first retaining input and a direction in which the operation character collides with the opponent character or the teammate character in the predetermined action.

According to the above configuration example, the user can visually confirm the degree of the first retaining input and the collision direction in the first gauge. Therefore, the operability of the first retaining input in the predetermined action is improved, and in addition, the operability of causing the operation character to collide with the opponent character or the teammate character is improved.

In another configuration example, the instructions may cause the information processing apparatus to, in the predetermined action, further move the operation character on the basis of an operation input by the user, while the first retaining input is performed.

According to the above configuration example, the operation character can be caused to collide with the opponent character or the teammate character while the operation character is being moved. Thus, the competitive sports game that is richer in sense of speed is realized.

In another configuration example, the instructions may further cause the information processing apparatus to: on the basis of an operation input by the user, perform a shooting action occurrence process of causing the operation character to perform shooting of the predetermined object toward the goal; in the shooting action occurrence process, determine a strength of the shooting in accordance with a degree of a second retaining input based on an operation input by the user; and while the second retaining input is performed, generate a game image including a second gauge indicating the degree of the second retaining input.

According to the above configuration example, since the strength of a shot changes in accordance with the degree of the second retaining input, a competitive sports game that is rich in strategic characteristics is realized.

According to the exemplary embodiment, it is possible to provide: a non-transitory computer-readable storage medium having stored therein a game program that can realize a novel action in which, in a sports game in which a character of a first team being an operation target of a user and a character of a second team of a competitive opponent compete against each other, a teammate character that belongs to the first team and that the operation character belonging to the first team has collided with, is caused to further collide with an opponent character belonging to the second team; a game processing system; a game processing apparatus; and a game processing method.

These and other objects, features, aspects, and effects of the exemplary embodiment will become more apparent from the following detailed description of non-limiting example embodiments when taken in conjunction with the accompanying drawings.

BRIEF DESCRIPTION OF THE DRAWINGS

FIG. 3 is a diagram for describing a non-limiting example of a tackle operation and the like;

FIG. 4 is a diagram for describing a non-limiting example of an ability parameter;

FIG. 5 is a diagram for describing a non-limiting example of behavior of a tackled opponent character;

FIG. 6 is a diagram for describing a non-limiting example of behavior of a tackled teammate character and behavior of an opponent character on which a team tackle has been performed;

FIG. 7 is a diagram for describing a non-limiting example of a case where the operation character has tackled an opponent character;

FIG. 12 is a diagram for describing a non-limiting example of a goal success probability of a super shot;

DETAILED DESCRIPTION OF NON-LIMITING EXAMPLE EMBODIMENTS

Hereinafter, an exemplary embodiment will be described.
[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. The information processing according to the exemplary embodiment can also be applied to a game system including a game apparatus, etc., as described above, and a predetermined server. In the exemplary embodiment, a stationary game apparatus (which may be referred to as a "game apparatus") will be described as an example of the information processing apparatus.

Figure 1:
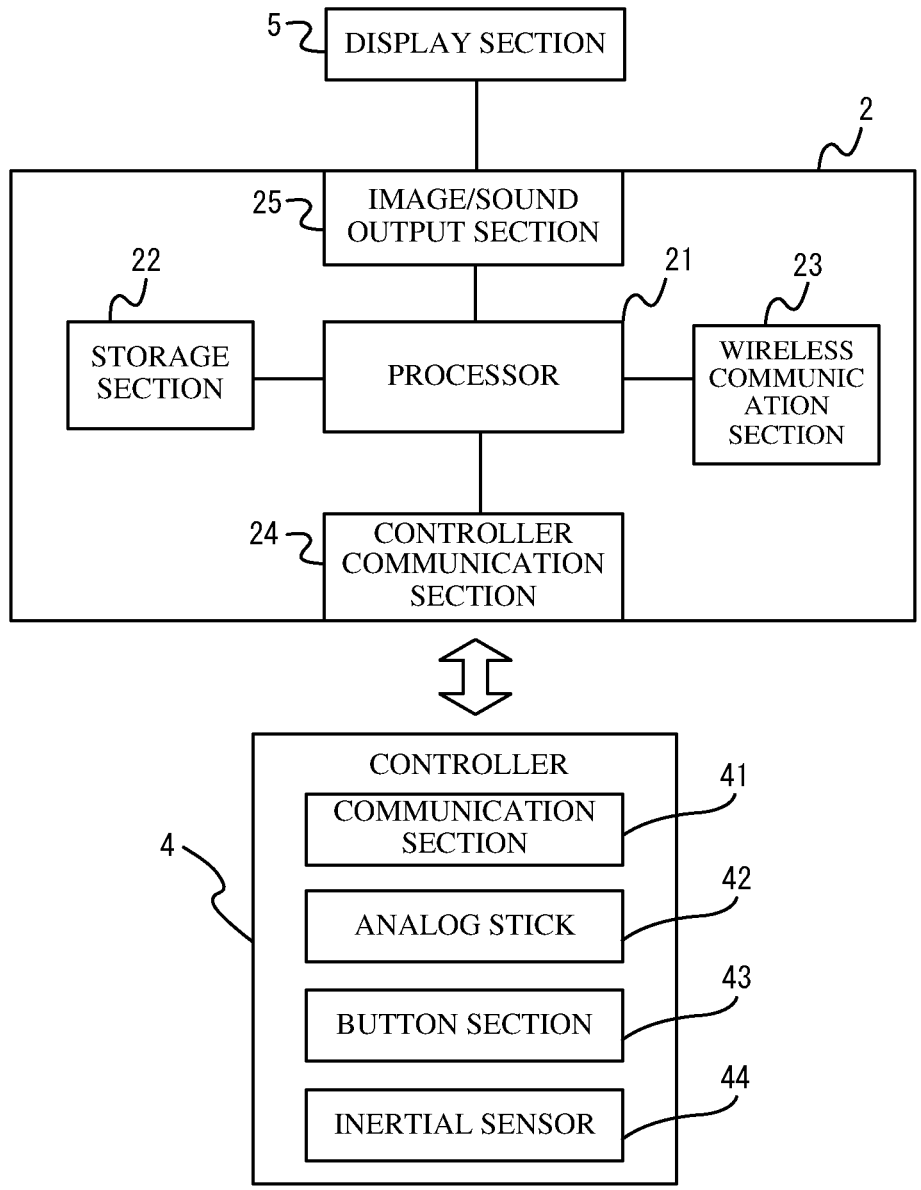
FIG. 1 is a block diagram of a non-limiting example of an internal configuration and the like of a game apparatus 2.

FIG. 1 is a block diagram showing an example of the internal configuration, etc., of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs various types of information processing by executing an information processing program (e.g., a game program) stored in a storage section 22. The storage section 22 may be, for example, an internal storage medium such as a flash memory or a DRAM (Dynamic Random Access Memory), or may be configured to utilize an external storage medium mounted to a slot that is not shown, or the like.

The game apparatus 2 includes a wireless communication section 23 which allows the game apparatus 2 to perform wireless communication with another game apparatus 2 or a predetermined server apparatus. As the wireless communication, for example, Internet communication or short-range wireless communication is used.

The game apparatus 2 includes a controller communication section 24 which allows the game apparatus 2 to perform wired or wireless communication with a controller 4.

A display section 5 (e.g., a television) is connected to the game apparatus 2 via an image/sound output section 25. The processor 21 outputs images or sounds generated (by executing the aforementioned information processing, for example), to the display section 5 via the image/sound output section 25.

Next, the controller 4 will be described. The controller 4 includes at least one analog stick 42 being an example of a direction input device. The analog stick 42 can be used as a direction input section capable of inputting a direction. By tilting the analog stick 42, a user can input a direction corresponding to the direction of the tilt (and an input having a magnitude corresponding to the angle of the tilt). The controller 4 includes a button section 43 including various operation buttons. For example, the controller 4 may include a plurality of operation buttons (e.g., an A button, a B button, an X button, and a Y button) on the main surface of the housing of the controller 4.

The controller 4 includes an inertial sensor 44. Specifically, the controller 4 includes an acceleration sensor and an angular velocity sensor, as the inertial sensor 44. In the exemplary embodiment, the acceleration sensor detects the magnitudes of accelerations along predetermined three-axis directions. The angular velocity sensor detects angular velocities around the predetermined three axes.

The controller 4 includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 at appropriate timings, to be transmitted to the game apparatus 2.

[Game Assumed in the Exemplary Embodiment]

Figure 2:
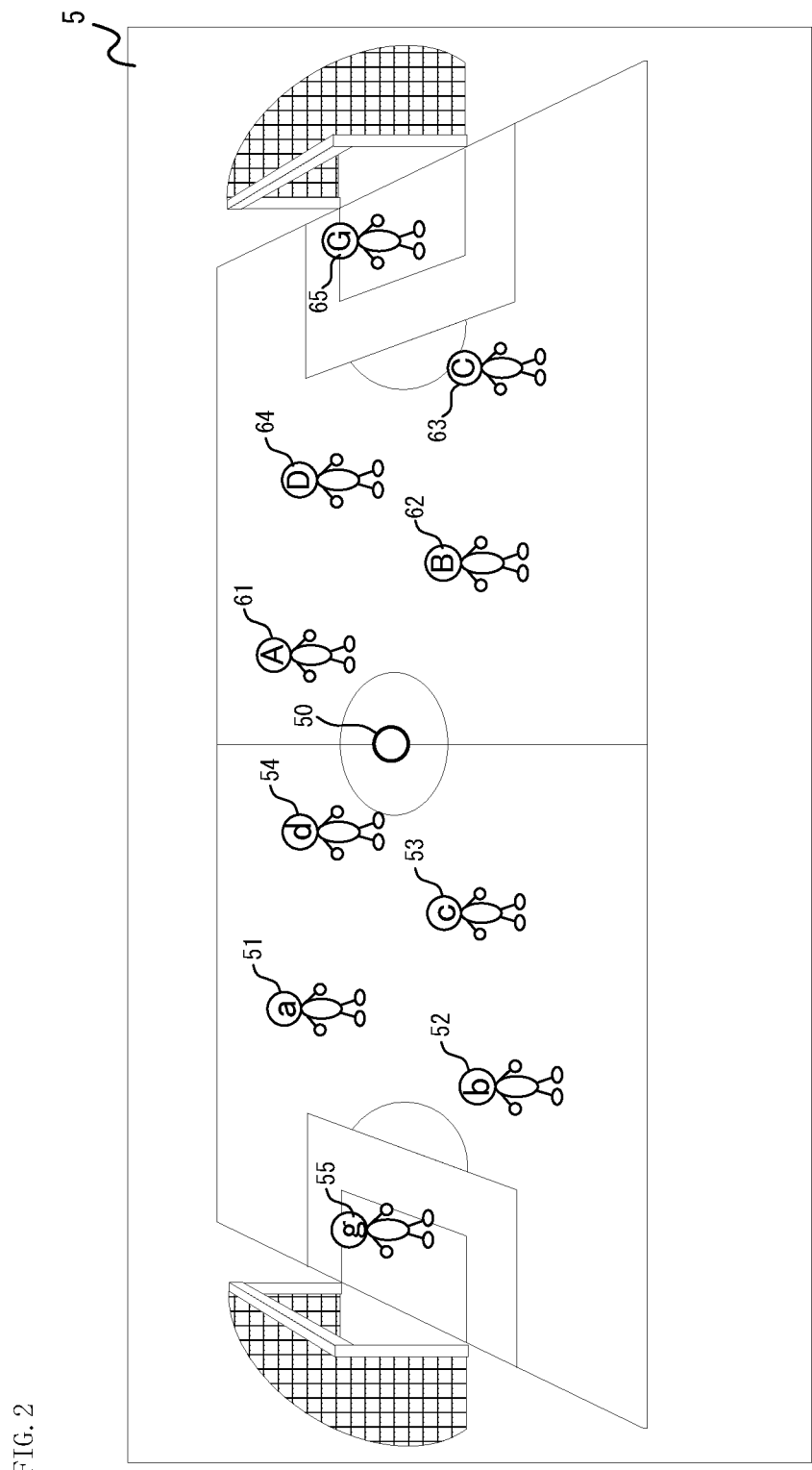
FIG. 2 is a diagram for describing a non-limiting example of an outline of this game.

Next, the outline of game processing (an example of information processing) executed by the game apparatus 2 according to the exemplary embodiment will be described. First, as shown in FIG. 2, the game assumed in the exemplary embodiment is a sports game of which the concept is soccer. Specifically, in this game, a plurality of athlete character objects (which may be referred to as "characters") being virtual human-type objects are arranged, while being divided in an opponent team and an own team, in a soccer field prepared in a virtual space, and a soccer game is performed. However, even though the concept of this game is soccer, the game need not be performed strictly in accordance with real soccer rules.

Here, in this game, it is assumed that each team has five characters. That is, this game is a sports game of 5 vs 5 by ten characters. This game can be played by a plurality of users via a network such as the Internet, or through short-range wireless communication or the like. In the exemplary embodiment, a case where one user (player) is in charge of one athlete character and operates the athlete character is assumed. In this game, since goalkeeper characters are operated by the computer of the game apparatus 2, a maximum of eight users can operate eight field player characters, thereby performing multi-play. When this game is played by less than eight users, each field player character that does not have a user is operated by the computer of the game apparatus 2. In the exemplary embodiment, one game apparatus is assigned to one user, and a maximum of eight game apparatuses 2 are connected through short-range wireless communication or the like.

In this game, even when a character collides with (tackles) another character so as to, for example, send the character flying, this is not considered as a foul. Further, as described later, the user can cause various game actions by operating a character so as to, for example, send another character flying.

In FIG. 2, in the own team, a goalkeeper character with "g" is denoted by reference character 55, a character with "a" is denoted by reference character 51, a character with "b" is denoted by reference character 52, a character with "c" is denoted by reference character 53, and a character with "d" is denoted by reference character 54. In the opponent team, a goalkeeper character with "G" is denoted by reference character 65, a character with "A" is denoted by reference character 61, a character with "B" is denoted by reference character 62, a character with "C" is denoted by reference character 63, and a character with "D" is denoted by reference character 64. In addition, a ball object (which may be referred to as a "ball") is represented by reference character 50.

[Outline of Game Processing of the Exemplary Embodiment]

Next, an outline of operation of game processing executed in the game apparatus 2 according to the exemplary embodiment will be described. As described above, this game is a sports game in which eight field player characters are operated by a maximum of eight users. By operating an operation target character (which may be referred to as an "operation character"), each user can cause the operation character to tackle (collide with) a character (which may be referred to as an "opponent character") in the opponent team excluding the goalkeeper character, and a character (which may be referred to as a "teammate character") in the own team, thereby moving the characters, for example. Further, it is also possible that a teammate character tackled by the operation character moves (is sent flying) to collide with an opponent character, thereby moving the opponent character (sending the opponent character flying). Hereinafter, description will be given assuming that the character 51 is the operation character.

FIG. 3 is diagram for describing an operation (which may be referred to as a "tackle operation") of causing the operation character to perform a tackle, and behavior of the operation character on which a tackle operation has been performed. When the user performs a tackle operation of pressing a predetermined button (Y button) in a state where the operation character is not keeping a ball 50, the user can cause the operation character to perform a tackle. In this tackle, the direction of the operation character is changed through operation of the analog stick 42, and then the operation character is caused to dash in the direction in which the operation character is oriented and to collide with another character. Hereinafter, this will be specifically described with reference to FIG. 3.

As shown in FIG. 3, the user performs, on the Y button, a tackle operation of a tap (a pressing operation of less than 0.1 seconds), a first long press (a long pressing operation of not less than 0.1 seconds and less than 1.0 second), or a second long press (a long pressing operation of not less than 1.0 second), thereby being able to cause the operation character to perform a tackle. Each long pressing operation may be referred to as a retaining pressing operation.

As shown in FIG. 3, when a first long press or a second long press has been performed, a tackle gauge 70 is displayed. The tackle gauge 70 indicates the distance and the direction (e.g., the front direction of the operation character) in which the operation character moves for a tackle, and the strength of the tackle to be executed (see FIG. 7, etc.). Meanwhile, in a case of a tap, the tackle gauge 70 is not displayed. Here, also while the user performs a tap, a first long press, or a second long pressing operation, the user can cause the operation character to, for example, move by operating the analog stick 42. It should be noted that, also in a case of a tap, the tackle gauge may be displayed.

As shown in FIG. 3, the tackle gauge 70 has such a shape in which two boomerangs are arranged. The color is gradually changed from the leading end (the pointed portion of the right boomerang) of the tackle gauge 70, whereby a display that the tackle gauge 70 is filled (is charged) is performed. The tackle gauge 70 in the column of the first long press in FIG. 3 is seemingly filled by about 70 percent. The tackle gauge 70 in the column of the second long press is filled by 100 percent. As shown in FIG. 3, the tackle gauge is not filled in the case of the tap, the tackle gauge filled degree becomes "1" in the case of the first long press, and the tackle gauge filled degree becomes "2" in the case of the second long press. That is, in a period in which a display in which the tackle gauge 70 is seemingly being filled by a first long press is performed, the tackle gauge filled degree is "1". When the tackle operation ends and the tackle is executed, the display of the tackle gauge 70 ends.

As shown in FIG. 3, the strength of a tackle is: "1" when a tap has been performed; "2" when a first long press has been performed; and "3" when a second long press has been performed. The strength of the tackle becomes stronger in the order of "1", "2", and "3". As shown in FIG. 3, the movement distance (the distance of a tackle) of the operation character due to the tackle is: 1 meter when a tap has been performed; 2 meters when a first long press has been performed; and 3 meters when a second long press has been performed. It should be noted that this movement distance is a distance in a game space (virtual space).

FIG. 4 is a diagram for describing ability parameters associated with each character. As shown in FIG. 4, each character is associated with ability parameters ("Physical", "Movement Speed", "Shooting Ability", "Pass Accuracy", and "Technique"). "Physical" indicates the physical strength (the strength, etc., against a tackle by an opponent character), "Movement Speed" indicates a running speed, "Shooting Ability" indicates the speed of a shot ball and the level of a goal success probability, "Pass Accuracy" indicates the level of a pass success rate, and "Technique" indicates the level of the skill of dribbling past an opponent character, the level of ball control, the magnitude of the curving degree of a shot ball, and the like. In FIG. 4, the greater the digit of the ability parameter is, the higher the ability is. As shown in FIG. 4, the values of the ability parameters can be set to various values for each character. Each ability parameter can be increased by equipping the operation character with acquired items. For example, by performing a predetermined operation, the user can equip the operation character with a protector, thereby enhancing Physical of the ability parameter. Further, for example, by performing a predetermined operation, the user can equip the operation character with special soccer shoes, thereby enhancing Shooting Ability and Pass Accuracy of the ability parameters. Here, depending on an item to be equipped, a certain ability parameter can be increased, whereas another ability parameter is decreased. For example, when Physical is enhanced by equipping with a protector, Movement Speed is decreased.

FIG. 5 is a diagram for describing behavior of an opponent character tackled by (subjected to collision with) the operation character. The opponent character (i.e., an opponent character on which an ordinary tackle has been performed) tackled by the operation character moves (is sent flying), by a distance according to the value of Physical (see FIG. 4) of the opponent character and the strength of the tackle (see FIG. 3), in the direction (collision direction) in which the operation character has moved for the tackle. Then, the opponent character is caused to lie down and forcibly stopped for a certain time (e.g., for 1.5 seconds) (i.e., enters a state where the opponent character cannot move for a certain time). Hereinafter, this will be specifically described.

As shown in FIG. 5, in a case where the opponent character has been tackled with a tackle strength of "1", when the Physical value is "3" or "2", the opponent character is neither sent flying by the tackle nor stopped for a certain time. Meanwhile, when the Physical value is "1", the opponent character is sent flying by 1 meter by the tackle and then stopped for a certain time. Here, in a case where the opponent character tackled by the operation character is sent flying and stopped for a certain time, if the opponent character has been keeping the ball, the keeping is canceled, and the ball becomes a loose ball. As shown in FIG. 5, in a case where the opponent character has been tackled with a tackle strength of "2", when the Physical value is "3", the opponent character is neither sent flying by the tackle nor stopped for a certain time. Meanwhile, when the Physical value is "2", the opponent character is sent flying by 1 meter by the tackle and then stopped for a certain time; and when the Physical value is "1", the opponent character is sent flying by 2 meters by the tackle and then stopped for a certain time. As shown in FIG. 5, in a case where the opponent character has been tackled with a tackle strength of "3", when the Physical value is "3", the opponent character is sent flying by 1 meter by the tackle and then stopped for a certain time; when the Physical value is "2", the opponent character is sent flying by 2 meters by the tackle and then stopped for a certain time; and when the Physical value is "1", the opponent character is sent flying by 3 meters by the tackle and then stopped for a certain time.

Here, when the operation character has tackled (including the above-described ordinary tackle and a later-described team tackle) an opponent character not keeping (possessing) the ball, and the opponent character has been sent flying and then stopped for a certain time, an item (first item) advantageous for the opponent team is provided to the opponent team. The advantageous item is an item that can be used only by the opponent team. Examples of the advantageous item include an item that increases, for a predetermined time (e.g., for 30 seconds), Movement Speed of the opponent character that uses the item (further, an item, when the opponent character bumps into a character of the team of the operation character having performed the tackle, that causes the character to fall and stop the character for a predetermined time), and an item that inhibits motion of a character of the team of the operation character having performed the tackle. As described above, when the operation character tackles an opponent character not keeping the ball, an item advantageous for the opponent team appears. This requires appropriate judgement by the user, and thus, strategic characteristics of the game are improved.

In this game, there is also an item (second item) that can be used by characters of both of the own team and the opponent team. This item is put into the soccer field every predetermined time, for example, and can be used by a character that has acquired the item. The item provides the same effect as that of the first item described above, for example.

FIG. 6 is a diagram for describing behavior of a teammate character tackled by (subjected to collision with) the operation character and behavior of the opponent character on which a team tackle has been performed. Here, the team tackle is a tackle in which a teammate character not keeping the ball and having moved (having been sent flying) by having been tackled by the operation character collides with an opponent character, to move the opponent character (to send the opponent character flying), thereby forcibly stopping (causing the opponent character to enter a state where the opponent character cannot move) the opponent character for a certain time (e.g., for 1.5 seconds).

First, behavior of a teammate character tackled by (subjected to collision with) the operation character will be described. As shown in FIG. 6, in a case where the teammate character has been tackled with a tackle strength of "1", when the teammate character is not keeping (possessing) the ball, the teammate character moves (is sent flying) by 2 meters in the direction (collision direction) in which the operation character has moved for the tackle, whereas when the teammate character is keeping the ball, the teammate character moves (is sent flying) by 4 meters in the direction (collision direction) in which the operation character has moved for the tackle. As shown in FIG. 6, in a case where a teammate character has been tackled with a tackle strength of "2", when the teammate character is not keeping the ball, the teammate character moves (is sent flying) by 4 meters in the direction in which the operation character has moved for the tackle, whereas when the teammate character is keeping the ball, the teammate character moves (is sent flying) by 8 meters in the direction in which the operation character has moved for the tackle. As shown in FIG. 6, in a case where a teammate character has been tackled with a tackle strength of "3", when the teammate character is not keeping the ball, the teammate character moves (is sent flying) by 6 meters in the direction in which the operation character has moved for the tackle, whereas when the teammate character is keeping the ball, the teammate character moves (is sent flying) by 12 meters in the direction in which the operation character has moved for the tackle. It should be noted that the Physical value (see FIG. 4) of the teammate character that is tackled is not related to the distance by which the teammate character moves (is sent flying) by the tackle. The tackled teammate character is not forcibly stopped and can continue movement and the like as usual.

In a case where a teammate character that is advancing is tackled from behind by the operation character into the advancing direction, the teammate character is accelerated and advances faster. Therefore, when a teammate character keeping the ball and advancing (or is stopped) is tackled from behind, the teammate character can be caused to move (in an accelerated manner), and thus, the teammate character can be caused to break through the defense of the opponent character.

Next, behavior of an opponent character on which a team tackle has been performed will be described. An opponent character (i.e., an opponent character on which a team tackle has been performed) that has been subjected to collision with a teammate character not keeping the ball and moving by having been tackled by the operation character moves (is sent flying), by a distance according to the Physical value (see FIG. 4) of the opponent character and the tackle strength (see FIG. 3), in the direction (collision direction) in which the teammate character has moved for the collision. Then, the opponent character is caused to lie down and forcibly stopped for a certain time (e.g., for 1.5 seconds) (i.e., enters a state where the opponent character cannot move for a certain time). Hereinafter, this will be specifically described. It should be noted that, in a case where the teammate character tackled by the operation character is keeping the ball, a team tackle is not caused, and the opponent character subjected to the collision with the teammate character does not move (is not sent flying), and is not stopped for a certain time thereafter, either.

As shown in FIG. 6, in a case where a team tackle has been performed on the opponent character with a tackle strength of "1", when the Physical value is "3", the opponent character is neither sent flying by the tackle nor stopped for a certain time. Meanwhile, when the Physical value is "2", the opponent character is sent flying by 1 meter by the tackle and then stopped for a certain time; and when the Physical value is "1", the opponent character is sent flying by 2 meters by the tackle and then stopped for a certain time. Here, in a case where the opponent character is sent flying by the team tackle and is stopped for a certain time, when the opponent character is keeping the ball, the teammate character having performed the team tackle takes and keeps the ball. It should be noted that the opponent character on which the team tackle has been performed may be sent flying irrespective of the Physical value. In such a case, when the opponent character is tackled with a tackle strength of "1" and the Physical value is "3", the opponent character may be sent flying by 0.5 meters, for example, and then stopped for a certain time. As shown in FIG. 6, in a case where a team tackle has been performed on the opponent character with a tackle strength of "2", when the Physical value is "3", the opponent character is sent flying by 3 meters by the tackle and then stopped for a certain time; when the Physical value is "2", the opponent character is sent flying by 4 meters by the tackle and then stopped for a certain time; and when the Physical value is "1", the opponent character is sent flying by 5 meters by the tackle and then stopped for a certain time. As shown in FIG. 6, in a case where a team tackle has been performed on the opponent character with a tackle strength of "3", when the Physical value is "3", the opponent character is sent flying by 6 meters by the tackle and then stopped for a certain time; when the Physical value is "2", the opponent character is sent flying by 7 meters by the tackle and then stopped for a certain time; and when the Physical value is "1", the opponent character is sent flying by 8 meters by the tackle and then stopped for a certain time.

Here, also in the case of the team tackle, similar to the ordinary tackle described with reference to FIG. 5, when an opponent character not keeping (possessing) the ball is tackled and the opponent character is sent flying and then stopped for a certain time, an item advantageous for the opponent team is provided to the opponent team. In this manner, also in the team tackle, when the opponent character not keeping the ball is tackled, an item advantageous for the opponent team appears. This requires appropriate judgement by the user, and thus, strategic characteristics of the game are improved.

FIG. 7 is a diagram for specifically describing a case where a tackle operation has been performed and the operation character 51 has tackled the opponent character 61 keeping the ball 50 (i.e., a case where an ordinary tackle has been performed). First, with reference to (1) of FIG. 7, a case where a tap operation has been performed as a tackle operation will be described.

As shown in (1-1) of FIG. 7, when a tap operation has been performed, the tackle gauge 70 is not displayed and a tackle is performed with a strength of "1", whereby the operation character 51 dashes forward (front direction) by 1 meter (see FIG. 3). Then, in a case where the operation character 51 has collided with the opponent character 61 keeping the ball (see (1-2) of FIG. 7), when the Physical value of the opponent character 61 is "1", the opponent character 61 moves (is sent flying) by 1 meter in the collision direction, lies down, and then is forcibly stopped for a certain time, and at this time, the ball 50 becomes a loose ball (see (1-3) of FIG. 7, and FIG. 5). Meanwhile, when the Physical value of the opponent character 61 is "2" or "3", the opponent character 61 neither moves nor is forcibly stopped for a certain time. In addition, the ball does not become a loose ball (see FIG. 5).

As shown in (2-1) of FIG. 7, in a case where a first long pressing operation (a pressing operation of not less than 0.1 seconds and less than 1.0 second) has been performed, a display indicating a filled degree of "1" at which the tackle gauge 70 is filled is performed, and then a tackle is performed with a strength of "2", whereby the operation character 51 dashes forward (front direction) by 2 meters (see FIG. 3). Then, in a case where the operation character 51 has collided with the opponent character 61 keeping the ball (see (2-2) of FIG. 7), when the Physical value of the opponent character 61 is "1", the opponent character 61 moves (is sent flying) by 2 meters in the collision direction, lies down, and then is forcibly stopped for a certain time; and when the Physical value of the opponent character 61 is "2", the opponent character 61 moves (is sent flying) by 1 meter in the collision direction, lies down, and then is forcibly stopped for a certain time, and at this time the ball 50 becomes a loose ball (see (2-3) of FIG. 7, and FIG. 5). Meanwhile, when the Physical value of the opponent character 61 is "3", the opponent character 61 neither moves nor is forcibly stopped for a certain time, and the ball does not become a loose ball (see FIG. 5).

As shown in (3-1) of FIG. 7, in a case where a second long pressing operation (a pressing operation of not less than 1.0 second) has been performed, a display indicating a filled degree of "2" at which the tackle gauge 70 is filled up to the upper limit is performed, and then, a tackle is performed with a strength of "3", whereby the operation character 51 dashes forward (front direction) by 3 meters (see FIG. 3). Then, in a case where the operation character 51 has collided with the opponent character 61 keeping the ball (see (3-2) of FIG. 7), when the Physical value of the opponent character 61 is "1", the opponent character 61 moves (is sent flying) by 3 meters in the collision direction, lies down, and then is forcibly stopped for a certain time; when the Physical value of the opponent character 61 is "2", the opponent character 61 moves (is sent flying) by 2 meters in the collision direction, lies down, and then is forcibly stopped for a certain time; and when the Physical value of the opponent character 61 is "3", the opponent character 61 moves (is sent flying) by 1 meter in the collision direction, lies down, and then is forcibly stopped for a certain time, and at this time, the ball 50 becomes a loose ball (see (3-3) of FIG. 7, and FIG. 5).

In the ordinary tackle described with reference to FIG. 7, in a case where a tackle has been performed on an opponent character not keeping the ball, an item (first item) advantageous for the opponent team is provided to the opponent team, as already described. In FIG. 7, although a case where the opponent character is keeping the ball has been described, the same also applies to a case where the opponent character is not keeping the ball.

Figure 8:
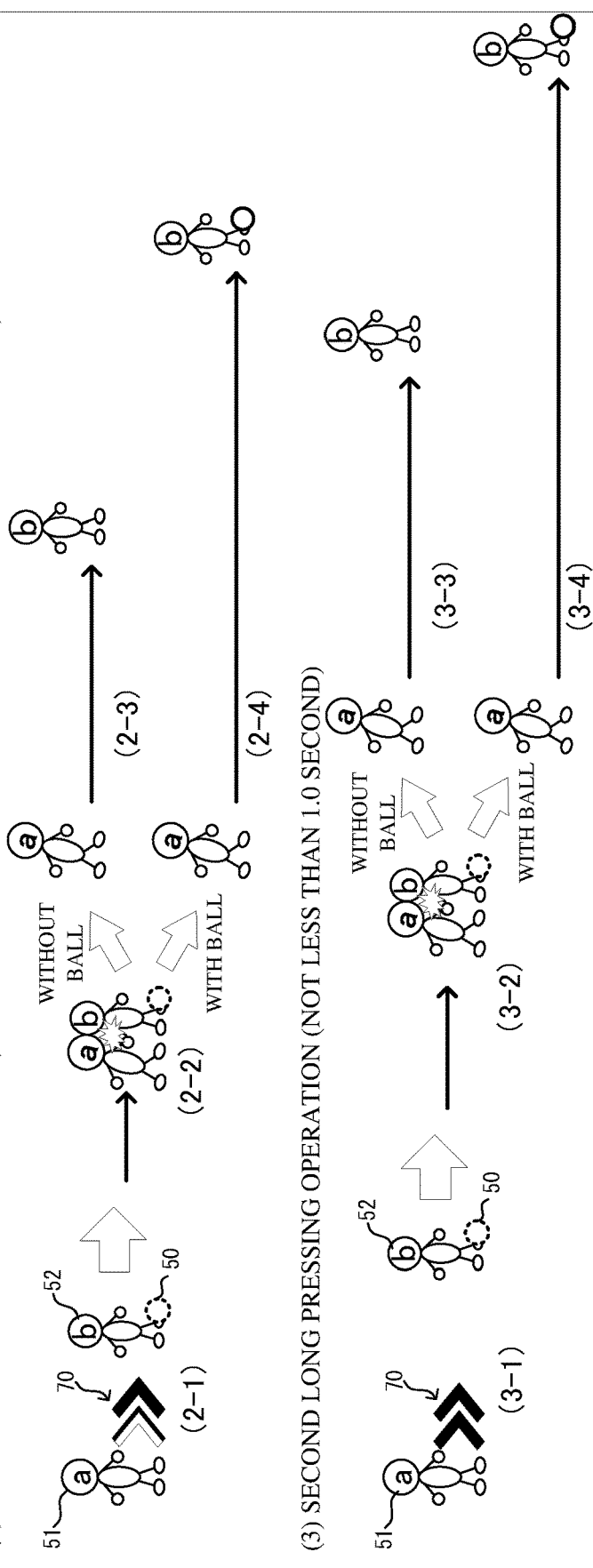
FIG. 8 is a diagram for describing a non-limiting example of a case where the operation character has tackled a teammate character.

FIG. 8 is a diagram for specifically describing a case where a tackle operation has been performed and the operation character 51 has tackled the teammate character 52 that is keeping or not keeping the ball 50. First, with reference to (1) of FIG. 8, a case where a tap operation has been performed as a tackle operation will be described. As shown in (1-1) of FIG. 8, when a tap operation has been performed, the tackle gauge 70 is not displayed and a tackle is performed with a strength of "1", whereby the operation character 51 dashes forward (front direction) by 1 meter (see FIG. 3). Then, in a case where the operation character 51 has collided with the teammate character 52 not keeping the ball (see (1-2) of FIG. 8), the teammate character 52 moves (is sent flying) by 2 meters in the collision direction and acts without being stopped (see (1-3) of FIG. 8, and FIG. 6). Meanwhile, in a case where the operation character 51 has collided with the teammate character 52 keeping the ball (see (1-2) of FIG. 8), the teammate character 52 moves (is sent flying) by 4 meters in the collision direction and acts without being stopped (see (1-4) of FIG. 8, and FIG. 6).

Next, as shown in (2-1) of FIG. 8, in a case where a first long pressing operation (a pressing operation of not less than 0.1 seconds and less than 1.0 second) has been performed, a display indicating a filled degree of "1" at which the tackle gauge 70 is filled is performed, and then, a tackle is performed with a strength of "2", whereby the operation character 51 dashes forward (front direction) by 2 meters (see FIG. 3). Then, in a case where the operation character 51 has collided with the teammate character 52 not keeping the ball (see (2-2) of FIG. 8), the teammate character 52 moves (is sent flying) by 4 meters in the collision direction and acts without being stopped (see (2-3) of FIG. 8, and FIG. 6). Meanwhile, in a case where the operation character 51 has collided with the teammate character 52 keeping the ball (see (2-2) of FIG. 8), the teammate character 52 moves (is sent flying) by 8 meters in the collision direction and acts without being stopped (see (2-4) of FIG. 8, and FIG. 6).

Next, as shown in (3-1) of FIG. 8, in a case where a second long pressing operation (a pressing operation of not less than 1.0 second) has been performed, a display indicating a filled degree of "2" at which the tackle gauge 70 is filled up to the upper limit is performed, and then a tackle is performed with a strength of "3", whereby the operation character 51 dashes forward (front direction) by 3 meters (see FIG. 3). Then, in a case where the operation character 51 has collided with the teammate character 52 not keeping the ball (see (3-2) of FIG. 8), the teammate character 52 moves (is sent flying) by 6 meters in the collision direction and acts without being stopped (see (3-3) of FIG. 8, and FIG. 6). Meanwhile, in a case where the operation character 51 has collided with the teammate character 52 keeping the ball (see (3-2) of FIG. 8), the teammate character 52 moves (is sent flying) by 12 meters in the collision direction and acts without being stopped (see (3-4) of FIG. 8, and FIG. 6).

In the tackles described with reference to FIG. 8, in a case where the teammate character 52 that is advancing is tackled from behind by the operation character 51 into the advancing direction, the teammate character is accelerated and advances faster, irrespective of whether the teammate character is keeping the ball.

Figure 9:
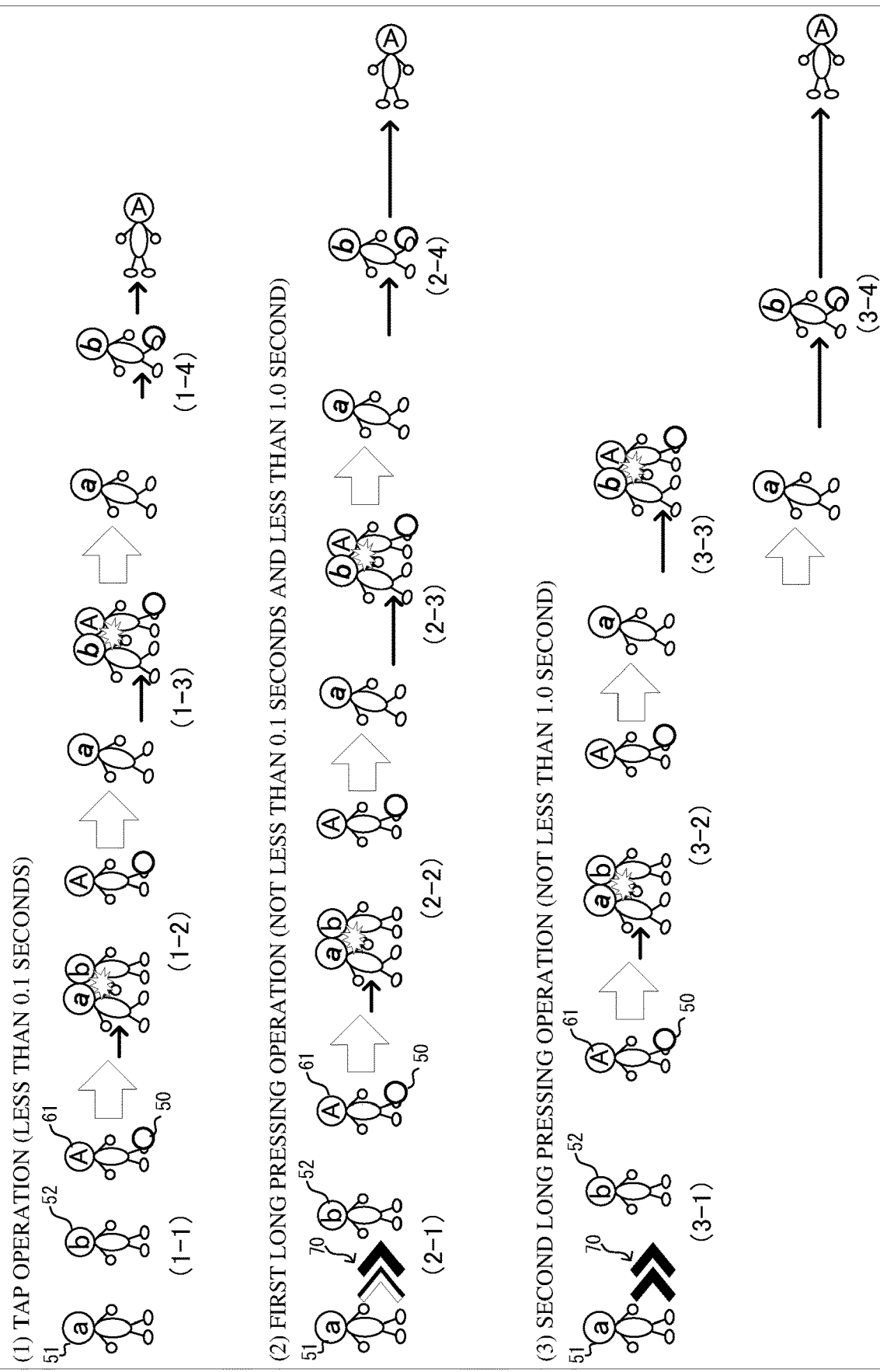
FIG. 9 is a diagram for describing a non-limiting example of a case where a team tackle has been performed.

FIG. 9 is a diagram for specifically describing a case where a team tackle has been performed. First, with reference to (1) of FIG. 9, a case where a tap operation has been performed as a tackle operation will be described. As shown in (1-1) of FIG. 9, when a tap operation has been performed, the tackle gauge 70 is not displayed and a tackle is performed with a strength of "1", whereby the operation character 51 dashes forward (front direction) by 1 meter (see FIG. 3). Then, in a case where the operation character 51 has collided with the teammate character 52 not keeping the ball (see (1-2) of FIG. 9), the teammate character 52 moves (is sent flying) by 2 meters in the collision direction. Then, in a case where the teammate character 52 has collided with the opponent character 61 during the movement ((1-3) of FIG. 9), when the Physical value of the opponent character 61 is "1", the opponent character 61 moves (is sent flying) by 2 meters in the collision direction, lies down, and then is forcibly stopped for a certain time; and when the Physical value of the opponent character 61 is "2", the opponent character 61 moves (is sent flying) by 1 meter in the collision direction, lies down, and then is forcibly stopped for a certain time, and at this time, the teammate character 52 takes and keeps the ball 50 (see (1-4) of FIG. 9, and FIG. 6). When the Physical value of the opponent character 61 is "3", the opponent character 61 neither moves nor is forcibly stopped for a certain time, and the teammate character 52 does not take the ball 50 (FIG. 6).

As shown in (2-1) of FIG. 9, in a case where a first long pressing operation (a pressing operation of not less than 0.1 seconds and less than 1.0 second) has been performed, a display indicating a filled degree of "1" at which the tackle gauge 70 is filled is performed, and then, a tackle is performed with a strength of "2", whereby the operation character 51 dashes forward (front direction) by 2 meters (see FIG. 3). Then, in a case where the operation character 51 has collided with the teammate character 52 not keeping the ball (see (2-2) of FIG. 9), the teammate character 52 moves (is sent flying) by 4 meters in the collision direction. Then, in a case where the teammate character 52 has collided with the opponent character 61 during the movement (see (2-3) of FIG. 9), when the Physical value of the opponent character 61 is "1", the opponent character 61 moves (is sent flying) by 5 meters in the collision direction, lies down, and then is forcibly stopped for a certain time; when the Physical value of the opponent character 61 is "2", the opponent character 61 moves (is sent flying) by 4 meters in the collision direction, lies down, and then is forcibly stopped for a certain time; and when the Physical value of the opponent character 61 is "3", the opponent character 61 moves (is sent flying) by 3 meters in the collision direction, lies down, and then is forcibly stopped for a certain time, and at this time, the teammate character 52 takes and keeps the ball 50 (see (2-4) of FIG. 9, and FIG. 6).

As shown in (3-1) of FIG. 9, in a case where a second long pressing operation (a pressing operation of not less than 1.0 second) has been performed, a display indicating a filled degree of "2" at which the tackle gauge 70 is filled up to the upper limit is performed, and then a tackle is performed with a strength of "3", whereby the operation character 51 dashes forward (front direction) by 3 meters (see FIG. 3). Then, in a case where the operation character 51 has collided with the teammate character 52 not keeping the ball (see (3-2) of FIG. 9), the teammate character 52 moves (is sent flying) by 6 meters in the collision direction. Then, in a case where the teammate character 52 has collided with the opponent character 61 during the movement (see (3-3) of FIG. 9), when the Physical value of the opponent character 61 is "1"; the opponent character 61 moves (is sent flying) by 8 meters in the collision direction, lies down, and then is forcibly stopped for a certain time; when the Physical value of the opponent character 61 is "2", the opponent character 61 moves (is sent flying) by 7 meters in the collision direction, lies down, and then is forcibly stopped for a certain time; and when the Physical value of the opponent character 61 is "3", the opponent character 61 moves (is sent flying) by 6 meters in the collision direction, lies down, and then is forcibly stopped for a certain time, and at this time, the teammate character 52 takes and keeps the ball 50 (see (2-4) of FIG. 9, and FIG. 6).

In the team tackles described with reference to FIG. 9, in a case where a teammate character has collided with a opponent character not keeping the ball, an item advantageous for the opponent team is provided to the opponent team, as already described. In FIG. 9, although a case where the opponent character is keeping the ball has been described, the same also applies to a case where the opponent character is not keeping the ball.

Figure 10:
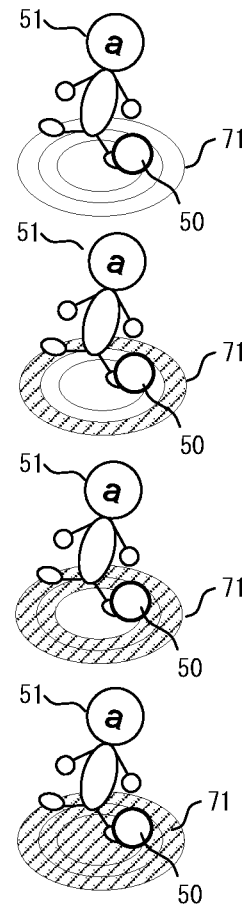
FIG. 10 is a diagram for describing a non-limiting example of an ordinary shot.

FIG. 10 is a diagram for describing an ordinary shot. When the user performs an ordinary shot operation of pressing a predetermined button (A button) inside the opponent field (a field region on the opponent goal side with respect to the center line), the user can cause the operation character to perform an ordinary shot. In an ordinary shot, at the time point when the A button has been pressed, an ordinary shot gauge 71 having a concentric circle shape composed of three circles, i.e., large, medium, and small, is displayed at a foot of the operation character 51. Then, in accordance with the length of the pressing time of the A button, the ordinary shot gauge 71 is filled (charged). When the pressing operation is canceled at a high filled degree of the ordinary shot gauge 71, a stronger ordinary shot is hit accordingly, and the goal success rate is increased. The goal success probability becomes higher when an ordinary shot is performed at a position closer to the opponent goal. In a period (the period in which the ordinary shot gauge 71 is displayed) in which the user is pressing the A button, the operation character is stopped in a posture of going to hit a shot. At the time point when the pressing operation is canceled, the display of the ordinary shot gauge 71 ends and a shot is hit. At the time point when the user has pressed the A button, the operation character automatically faces the opponent goal, and when the pressing operation is canceled, a shot is automatically hit toward the inside of the frame of the opponent goal.

Hereinafter, this will be specifically described with reference to FIG. 10. As shown in FIG. 10, at the time point when the user has started pressing the A button, the ordinary shot gauge 71 having a concentric circle shape composed of three circles, i.e., large, medium, and small, is displayed at a foot the operation character 51. When the operation by the user is a tap operation (a pressing operation of less than 0.1 seconds), the ordinary shot gauge 71 is not filled (see (1) of FIG. 10) and a relatively weak ordinary shot is hit. When the operation by the user is a first long pressing operation (a long pressing operation of not less than 0.1 seconds and less than 0.5 seconds), the ordinary shot gauge 71 is filled up to a first level as shown in (2) of FIG. 10, and an ordinary shot stronger than that in the case of a tap operation is hit. When the operation by the user is a second long pressing operation (a long pressing operation of not less than 0.5 seconds and less than 1.0 second), the ordinary shot gauge 71 is filled up to a second level as shown in (3) of FIG. 10, and an ordinary shot stronger than that in the case of the first long pressing operation is hit. When the operation by the user is a third long pressing operation (a long pressing operation of not less than 1.0 second), the ordinary shot gauge 71 is filled up to the maximum third level as shown in (4) of FIG. 10, and an ordinary shot stronger than that in the case of the second long pressing operation is hit. Each long pressing operation may be referred to as a retaining pressing operation.

Figure 11:
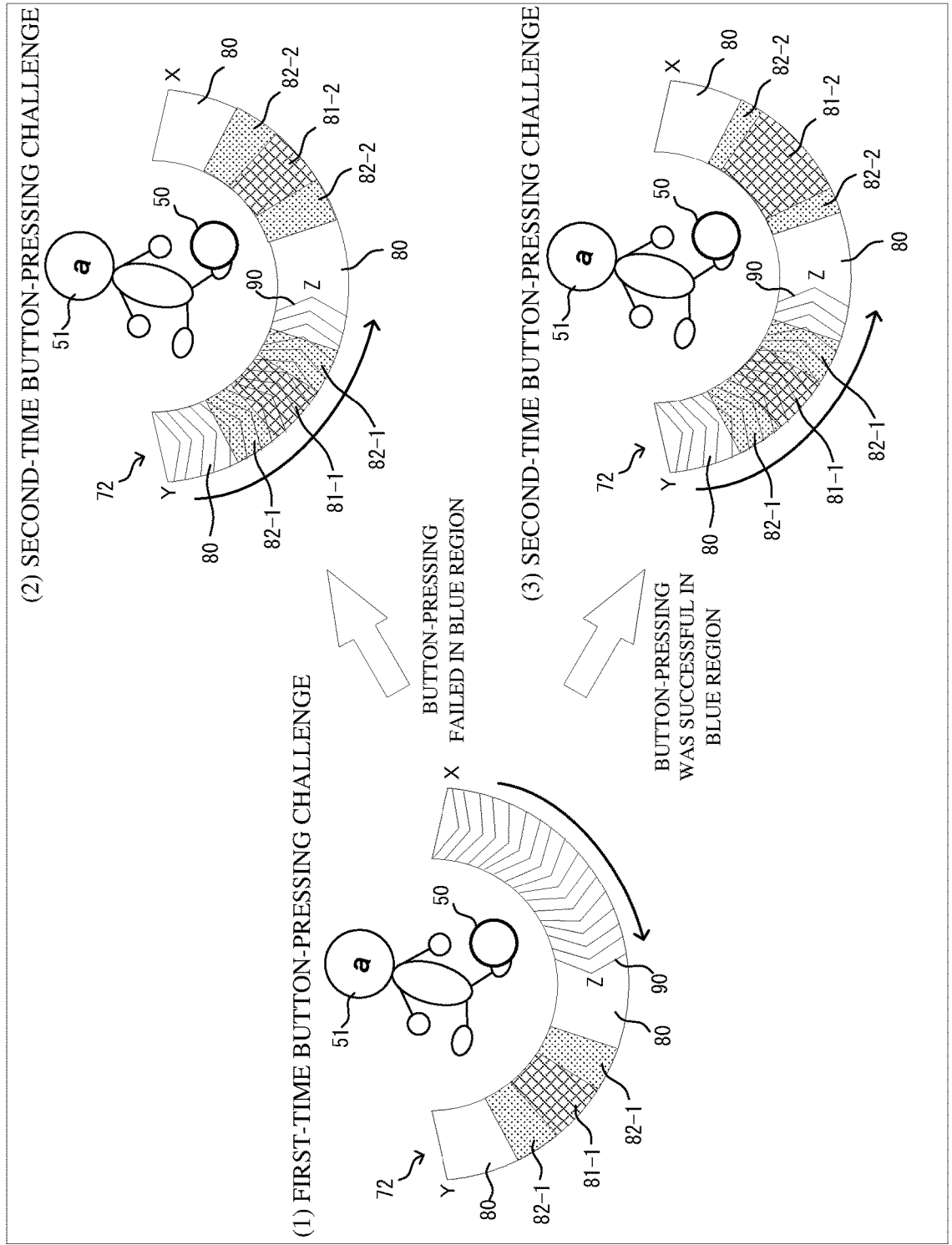
FIG. 11 is a diagram for describing a non-limiting example of a super shot.

FIG. 11 is diagram for describing a super shot. Within a predetermined time (e.g., within 10 seconds) after the operation character has obtained a predetermined item (super shot item), when the user performs a super shot operation in which: the user has performed a long press on a predetermined button (A button) for a predetermined time (e.g., not less than 1.0 second) within the opponent field (a field region on the opponent goal side with respect to the center line); and then challenges pressing the predetermined button (A button) two times, the user can cause the operation character to perform a super shot. In the above-described challenge of pressing the A button two times, a goal success probability of a super shot is determined in accordance with the timings at which the A button has been pressed two times.

Hereinafter, this will be specifically described with reference to FIG. 11. As shown in (1) of FIG. 11, in a super shot, at the time point when the A button has been pressed for a predetermined time (e.g., not less than 1.0 second), the operation character 51 takes a posture of shooting and a super shot gauge 72 having a band shape curved in an arc shape is displayed at a foot of the operation character 51. At the time point when the super shot gauge 72 has been displayed, a first blue region 81-1 is displayed in a region on the left side of a major region 80 of the super shot gauge 72, and first yellow regions 82-1 are displayed on both sides of the first blue region 81-1, as shown in (1) of FIG. 11. The major region 80 is white.

Then, as shown in (1) of FIG. 11, from a right end X toward a left end Y of the super shot gauge 72, a press timing scale 90 (indicator indicating the press timing: gauge bar) with a leading end Z at the head is displayed in an increasing manner. Then, in a period in which the press timing scale 90 is moving from the right end X toward the left end Y, the user presses the A button, thereby being able to perform a first-time button-pressing challenge. In the first-time button-pressing challenge, the user performs a challenge of pressing the A button at the time point when the leading end (which may be referred to as a "gauge bar leading end") Z of the press timing scale 90 has reached the first blue region 81-1.

When the press timing scale 90 has moved up to the left end Y, the period of the first-time button-pressing challenge ends. Then, as shown in (2) and (3) of FIG. 11, the press timing scale 90 returns at the left end Y and advances toward the right end X while being displayed in an increasing manner. Then, the second-time button-pressing challenge starts. The press timing scale 90 is displayed in an increasing manner at a certain speed (fixed speed) in the period of the first-time button-pressing challenge and the period of the second-time button-pressing challenge. When the second-time button-pressing challenge has started, a second blue region 81-2 is displayed in a region on the right side of the major region 80 of the super shot gauge 72, and second yellow regions 82-2 are displayed on both sides of the second blue region 81-2, as shown in (2) and (3) of FIG. 11.

Then, in a case where pressing the A button at the time point when the leading end Z of the press timing scale 90 has reached the first blue region 81-1 has failed in the first-time button-pressing challenge, the second blue region 81-2 and the second yellow regions 82-2 are displayed, as shown in (2) of FIG. 11, so as to have the same shape and the same area as those of the first blue region 81-1 and the first yellow regions 82-1 displayed on the left side. Meanwhile, in a case where pressing the A button at the time point when the leading end Z of the press timing scale 90 has reached the first blue region 81-1 has been successful in the first-time button-pressing challenge, the second blue region 81-2 is displayed so as to have an enlarged area with respect to that of the first blue region 81-1 displayed in the region on the left side, and the second yellow regions 82-2 are displayed so as to have reduced areas with respect to those of the first yellow regions 82-1 displayed in the regions on the left side, as shown in (3) of FIG. 11. Here, the area and the shape obtained by combining the second blue region 81-2 and the second yellow regions 82-2 are the same as the area and the shape obtained by combining the first blue region 81-1 and the first yellow regions 82-1. That is, in a case where button-pressing in the first blue region 81-1 has been successful in the first-time button-pressing challenge, parts of the second yellow regions 82-2 are replaced with the second blue region 81-2, whereby the blue region is enlarged in the second-time button-pressing challenge.

Then, as shown in (2) of FIG. 11, in a case where button-pressing in the first blue region 81-1 has failed in the first-time button-pressing challenge, a second-time button-pressing challenge of pressing the A button at the time point when the leading end Z of the press timing scale 90 (determination period display object) has reached the second blue region 81-2 is performed in a state where the blue region has not been enlarged. Meanwhile, as shown in (3) of FIG. 11, in a case where button-pressing in the first blue region 81-1 has been successful in the first-time button-pressing challenge, a second-time button-pressing challenge of pressing the A button at the time point when the leading end Z of the press timing scale 90 has reached the second blue region 81-2 is performed in a state (advantageous state) where the second blue region 81-2 has been enlarged with respect to the first blue region 81-1. Then, as a result of the press timing scale 90 moving up to the right end X, the second-time button-pressing challenge ends and display of the super shot gauge 72 ends, and then, a super shot is executed. It should be noted that the first blue region 81-1 and the second blue region 81-2 may be referred to as a meeting zone. Further, the first blue region 81-1 may be referred to as a "first period", the second blue region 81-2 may be referred to as a "second period", and each second yellow region 82-2 may be referred to as a "third period".

FIG. 12 is diagram for describing an example of the above-described button-pressing challenges performed two times and the goal success probability of a super shot. As shown in FIG. 12, in the button-pressing challenges performed two times, when the button-pressings are both performed in the white major region 80, the goal success probability is 5%. When the button-pressings are performed in the white major region 80 and the yellow region (82-1 or 82-2), the goal success probability is 20%. When the button-pressings are performed in the white major region 80 and the blue region (81-1 or 81-2), the goal success probability is 40%. When the button-pressings are both performed in the yellow region (82-1, 82-2), the goal success probability is 50%. When the button-pressings are performed in the yellow region (82-1 or 82-2) and the blue region (81-1 or 81-2), the goal success probability is 80%. When the button-pressings are both performed in the blue region (81-1, 81-2), the goal success probability is 100%.

Details of Information Processing of the Exemplary Embodiment

Next, details of information processing of the exemplary embodiment will be described with reference to FIG. 13 to FIG. 19.

[Data to be Used]

Figure 13:
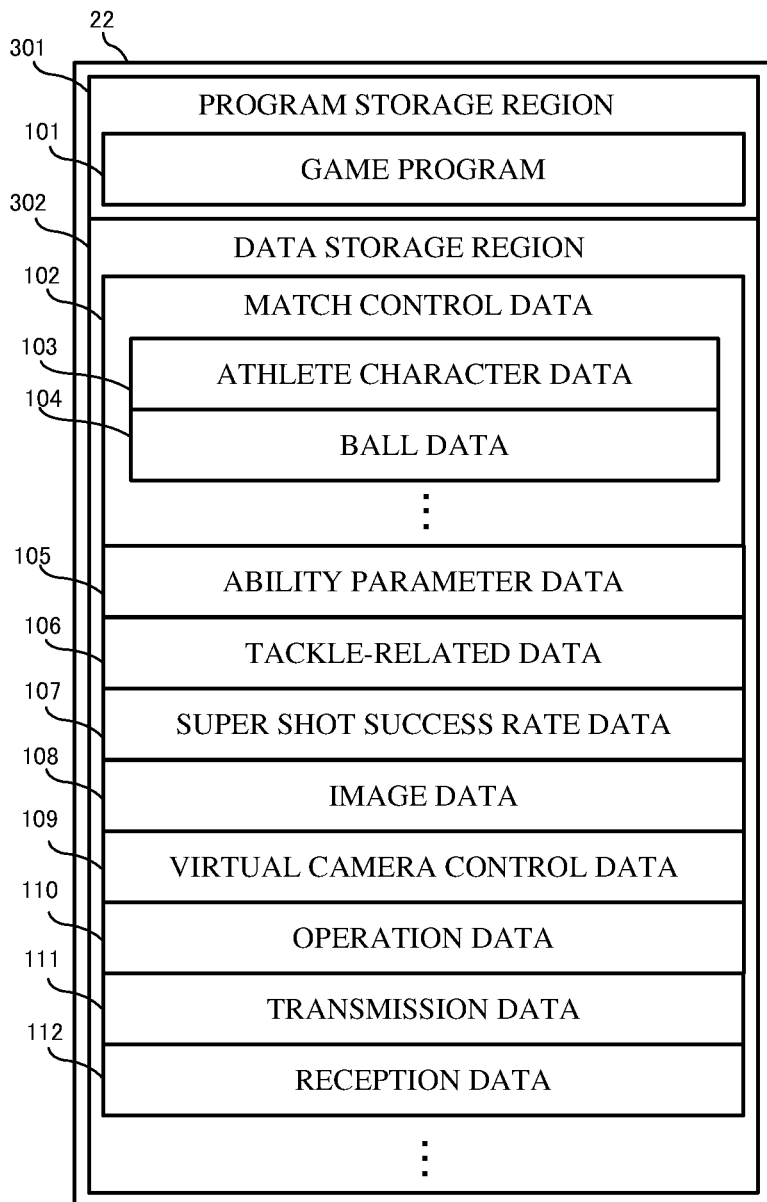
FIG. 13 shows a non-limiting example of various types of data stored in a storage section 22.

Various types of data to be used in this game processing will be described. FIG. 13 shows an example of a program and data stored in the storage section 22 of the game apparatus 2. As shown in FIG. 3, the storage section 22 is provided with at least a program storage region 301 and a data storage region 302. A game program 101 is stored in the program storage region 301. Match control data 102, athlete character data 103, ability parameter data 105, tackle-related data 106, super shot success rate data 107, image data 108, virtual camera control data 109, operation data 110, transmission data 111, reception data 112, and the like are stored in the data storage region 302. The match control data 102 includes the athlete character data 103 and ball data 104.

The game program 101 is a game program for executing the game processing according to the exemplary embodiment.

The athlete character data 103 is data regarding athlete characters. The athlete character data 103 includes various types of data for controlling motion of each athlete character, such as the current position, posture, and motion state (e.g., a state during shooting, during dribbling, or during making a tackle, and a state regarding an obtained item) of each athlete character.

The ball data 104 is data regarding the ball 50. The ball data 104 includes various types of data for controlling motion of the ball, such as the position, movement direction, and movement speed of the ball 50.

The ability parameter data 105 is data defining ability parameters associated with each character described with reference to FIG. 4.

The tackle-related data 106 is data regarding the ordinary tackle, the team tackle, and the like described with reference to FIG. 3 to FIG. 6. The tackle-related data 106 is data defining a movement distance (the distance of a tackle) of a character due to a tackle operation, a movement distance of a character tackled by a teammate character, a movement distance of a character on which an ordinary tackle has been performed, a movement distance of a character on which a team tackle has been performed, and the like.

The super shot success rate data 107 is data defining the goal success probability at the time when a super shot is performed, described with reference to FIG. 12.

The image data 108 is image data of athlete characters, a ball, a tackle gauge, an ordinary shot gauge, a super shot gauge, various types of items, a soccer field, and the like.

The virtual camera control data 109 is data for controlling motion of a virtual camera disposed in the virtual space. Specifically, the virtual camera control data 109 is data that designates the position/posture, angle of view, imaging direction, and the like of the virtual camera. The content of the virtual camera control data 109 is automatically set such that, during a match, basically, the athlete character operated by the user is at a substantially center of the screen. Other than the above, the virtual camera control data 109 may be set on the basis of an operation of the virtual camera by the user.

The operation data 110 is data indicating the content of an operation performed on the controller 4. For example, the operation data 110 includes data that indicates a press state with respect to the button section 43 and an input state with respect to the analog stick 42. The content of the operation data is updated in a predetermined cycle on the basis of a signal from the controller 4 (the communication section 41).

The transmission data 111 is data to be transmitted to another game apparatus, and is data that includes at least information for identifying the transmission source, and the contents of the operation data 110.

The reception data 112 is data stored such that transmission data received from another game apparatus can be discerned for each of the other game apparatuses (i.e., transmission sources).

Other than the above, various types of data to be used in game processing are stored in the storage section. For example, modeling data indicating the appearances of spectators and athlete characters, and the like are stored.

[Details of Game Processing]

Next, details of the game processing according to the exemplary embodiment will be described with reference to flowcharts. FIG. 14 to FIG. 19 are examples of flowcharts indicating details of the game processing according to the exemplary embodiment.

Figure 14:
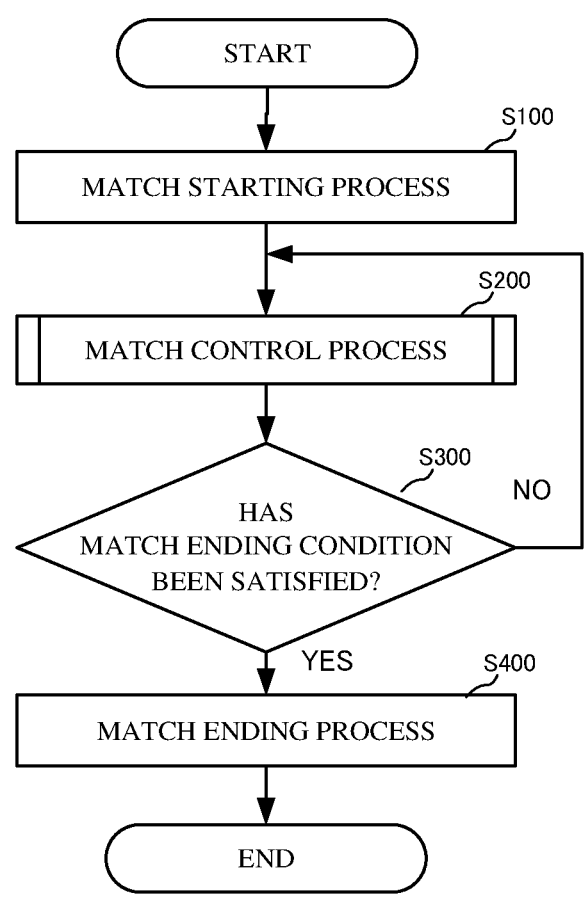
FIG. 14 is a non-limiting example of a flowchart of game processing.

First, upon start of this game processing, the processor 21 performs a match starting process in step S100 in FIG. 14. For example, the processor 21 displays a representation of the start of a match on the display section 5. Then, the process proceeds to step S200.

Figure 15:
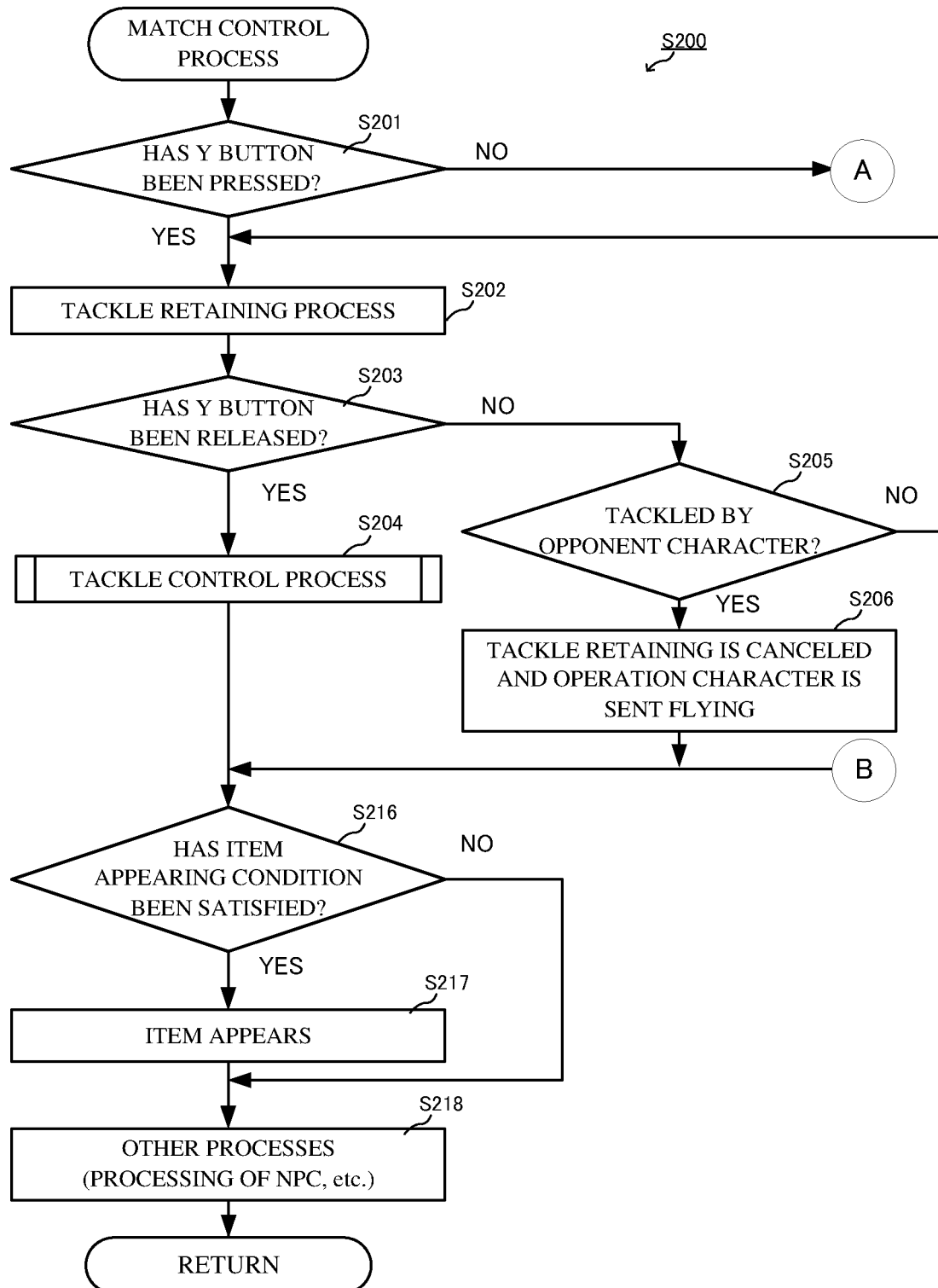
FIG. 15 is a non-limiting example of a flowchart of game processing.
Figure 16:
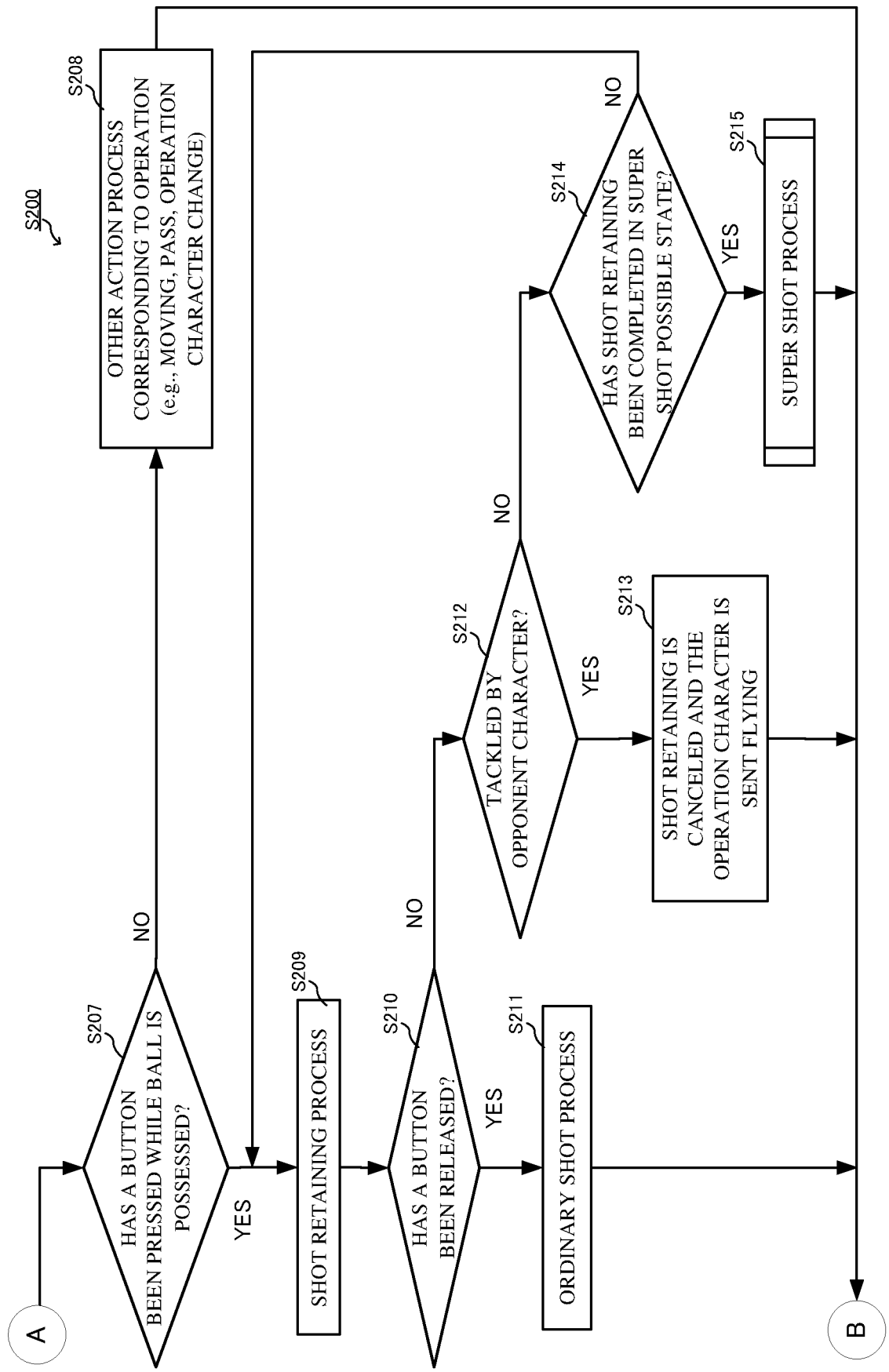
FIG. 16 is a non-limiting example of a flowchart of game processing.

In step S200, the processor 21 performs a match control process. FIG. 15 and FIG. 16 are examples of flowcharts showing the match control process. Hereinafter, the match control process will be described with reference to FIG. 15 and the like. In the following, a flow of a match will be described with reference to FIG. 15 and the like. However, during execution of the match control process, acquisition of operation data, control of each object in the virtual space, display of an image, and the like are performed in each frame (i.e., at a predetermined time interval).

First, in step S201 in FIG. 15, the processor 21 determines whether or not the Y button has been pressed, on the basis of the operation data 110. When this determination is YES, the process proceeds to step S202, and when this determination is NO, the process proceeds to step S207 in FIG. 16.

In step S202 in FIG. 15, the processor 21 performs a tackle retaining process on the basis of the operation data 110. Specifically, as described with reference to FIG. 3, in accordance with the time of a long pressing operation on the Y button, the processor 21 performs a display in which the tackle gauge 70 is being filled (charged), and determines (updates) a tackle strength in a case of execution of a tackle. As already described, also in a period in which the tackle retaining process is being performed, the user can move the operation character. That is, the user can move the operation character while charging the tackle gauge 70. Then, the process proceeds to step S203.

In step S203, on the basis of the operation data 110, the processor 21 determines whether or not the pressed Y button has been released. When this determination is YES, the process proceeds to step S204, and when this determination is NO, the process proceeds to step S205.

Figure 17:
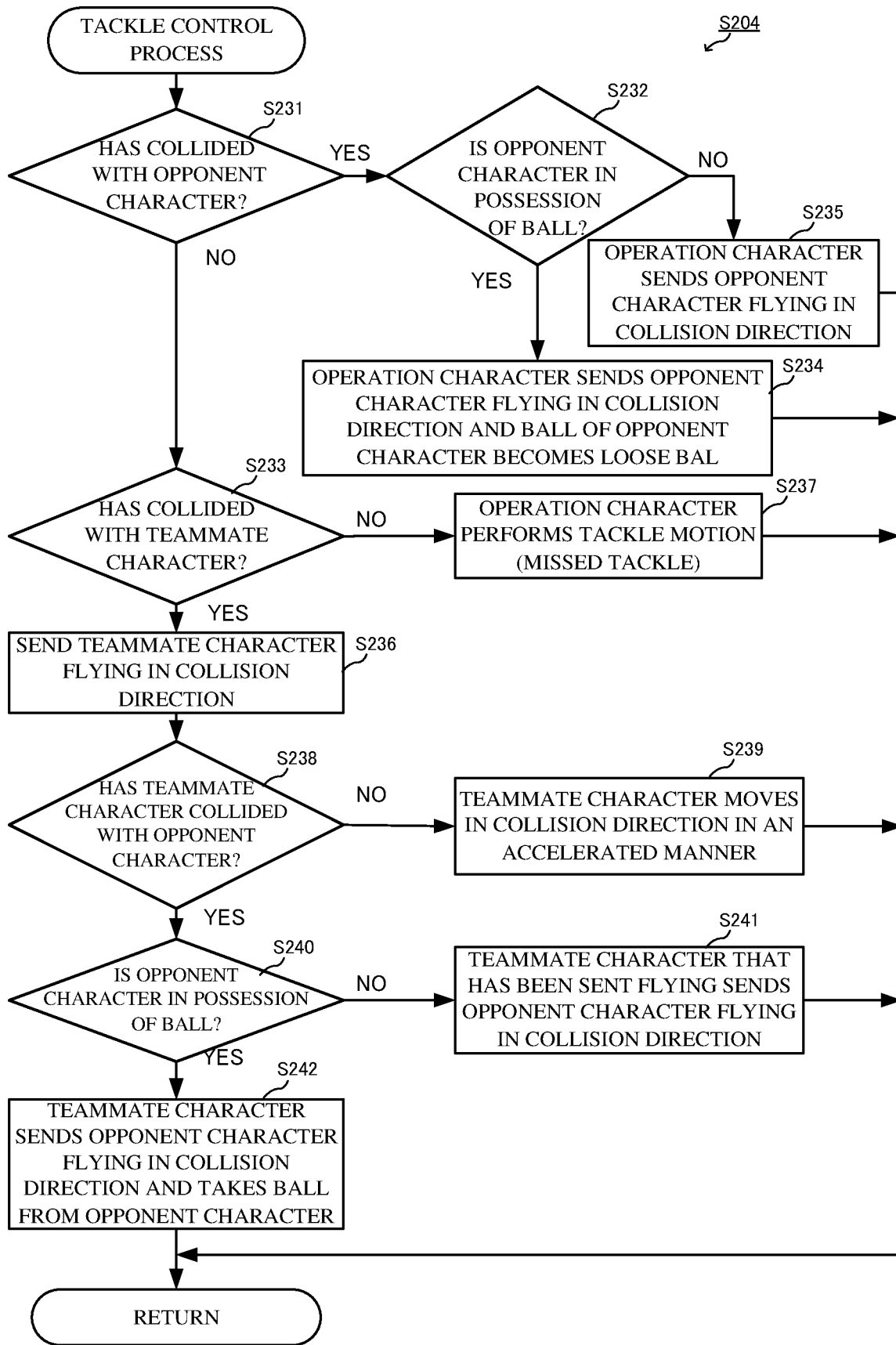
FIG. 17 is a non-limiting example of a flowchart of game processing.

In step S204, the processor 21 performs a tackle control process. FIG. 17 is an example of a flowchart showing the tackle control process. Hereinafter, the tackle control process will be described with reference to FIG. 17.

In step S231 in FIG. 17, the processor 21 determines whether or not the operation character has collided with an opponent character, on the basis of the athlete character data 103 (the position of the operation character and the position of the opponent character). When this determination is YES, the process proceeds to step S232, and when this determination is NO, the process proceeds to step S233.

In step S232, on the basis of the athlete character data 103, the processor 21 determines whether or not the opponent character is possessing (keeping) the ball. When this determination is YES, the process proceeds to step S234, and when this determination is NO, the process proceeds to step S235.

In step S234, on the basis of the tackle-related data 106 and the ability parameter data 105, the processor 21 performs a control of causing the operation character to send the opponent character flying in the collision direction and causing the ball possessed by the opponent character to be a loose ball (see FIG. 7). Then, the process proceeds to step S216 in FIG. 15.

In step S235, on the basis of the tackle-related data 106 and the ability parameter data 105, the processor 21 performs a control of causing the operation character to send the opponent character flying in the collision direction. Then, the process proceeds to step S216 in FIG. 15.

In step S233, on the basis of the athlete character data 103 (the position of the operation character and the position of a teammate character), the processor 21 determines whether or not the operation character has collided with the teammate character. When this determination is YES, the process proceeds to step S236, and when this determination is NO, the process proceeds to step S237.

In step S237, on the basis of the tackle-related data 106, the processor 21 performs a control of causing the operation character to perform a tackle motion. In this case, the operation character merely performs the tackle motion, and the tackle results in a missed tackle. Then, the process proceeds to step S216 in FIG. 15.

In step S236, on the basis of the tackle-related data 106, the processor 21 performs a control of causing the operation character to send the teammate character flying in the collision direction. Then, the process proceeds to step S216 in FIG. 15.

In step S238, on the basis of the athlete character data 103 (the position of an opponent character and the position of the teammate character), the processor 21 determines whether or not the teammate character tackled by the operation character has collided with the opponent character. When this determination is YES, the process proceeds to step S240, and when this determination is NO, the process proceeds to step S239.

In step S239, on the basis of the tackle-related data 106, the processor 21 performs a control of causing the teammate character tackled by the operation character to move in an accelerated manner in the collision direction (see FIG. 8). It should be noted that, when the teammate character is possessing the ball, the teammate character is more accelerated than when the teammate character is not possessing the ball (see (1-3) and (1-4) in FIG. 8, etc.). Then, the process proceeds to step S216 in FIG. 15.

In step S240, on the basis of the athlete character data 103, the processor 21 determines whether or not the opponent character (i.e., the opponent character on which a team tackle has been performed) that the teammate character sent flying by the operation character has collided with, is possessing the ball. When this determination is YES, the process proceeds to step S242, and when this determination is NO, the process proceeds to step S241.

In step S241, on the basis of the tackle-related data 106 and the ability parameter data 105, the processor 21 performs a control of sending flying, in the collision direction, the opponent character (i.e., the opponent character on which the team tackle has been performed) that the teammate character sent flying by the operation character has collided with. Then, the process proceeds to step S216 in FIG. 15.

In step S242, on the basis of the tackle-related data 106 and the ability parameter data 105, the processor 21 performs a control of causing the teammate character sent flying by the operation character to send flying, in the collision direction, the opponent character (i.e., the opponent character on which the team tackle has been performed) that the teammate character has collided with, and to take the ball from the opponent character (see FIG. 9). Then, the process proceeds to step S216 in FIG. 15. This is the end of description of the tackle control process.

With reference back to FIG. 15, in step S205, on the basis of the athlete character data 103 (the position of the operation character, the position of an opponent character, and the motion state of the opponent character), the processor 21 determines whether or not the operation character has been tackled by the opponent character. When this determination is NO, the process returns to step S202, and when this determination is YES, the process proceeds to step S206. Through repetition of the processes of steps S202, S203, and S205, the tackle gauge 70 being filled is displayed and the tackle strength in a case of execution of a tackle is increased.

In step S206, the processor 21 cancels retaining of a tackle (filling the tackle gauge 70), and performs a control of causing the operation character to be sent flying by a tackle by the opponent character, on the basis of the tackle-related data 106 and the ability parameter data 105. Then, the process proceeds to step S216. With respect to an opponent character operated by another user in another game apparatus as well, controls similar to those in the tackle control process described above are performed. That is, also on an operation character (an opponent character when viewed from the own game apparatus) in another game apparatus, controls similar to those in the tackle control process described above are performed, and a control in which the operation character is sent flying by a tackle, and the like, are performed.

Through the processes of step S201 to S206 described above, the tackle-related control described with reference to FIG. 3 to FIG. 9 is realized.

In step S207 in FIG. 16, on the basis of the athlete character data 103 and the operation data 110, the processor 21 determines whether or not the A button has been pressed while the operation character is possessing the ball. When this determination is YES, the process proceeds to step S209, and when this determination is NO, the process proceeds to step S208.

In step S208, on the basis of the operation data 110, the processor 21 executes another action corresponding to an operation by the user. Specifically, the processor 21 causes a moving motion, a pass motion, or the like of the operation character in accordance with an operation by the user. In a case where a single user performs the game while switching a plurality of teammate characters as an operation character, the processor 21 performs a process of switching the operation character in accordance with an operation by the user. Then, the process proceeds to step S216 in FIG. 15.

In step S209, on the basis of the operation data 110 and the athlete character data 103, the processor 21 performs a shot retaining process. For example, as described with reference to FIG. 10, the processor 21 performs a display in which the ordinary shot gauge 71 is being filled in accordance with the time of a long pressing operation performed on the A button (see FIG. 10). Further, for example, as described with reference to FIG. 11, in a case where the A button has been pressed in the opponent field within a predetermined time after the operation character has obtained a super shot item, the processor 21 counts a long pressing time (e.g., 1.0 second) for challenging a super shot. Then, the process proceeds to step S210.

In step S210, on the basis of the operation data 110, the processor 21 determines whether or not the pressed A button has been released. When this determination is YES, the process proceeds to step S211, and when this determination is NO, the process proceeds to step S212.

In step S211, the processor 21 performs a process of causing the operation character to perform an ordinary shot described with reference to FIG. 10. Then, the process proceeds to step S216 in FIG. 15.

In step S212, on the basis of the athlete character data 103 (the position of the operation character, the position of an opponent character, and the motion state of the opponent character), the processor 21 determines whether or not the operation character has been tackled by the opponent character. When this determination is YES, the process proceeds to step S213, and when this determination is NO, the process proceeds to step S214.

In step S213, the processor 21 cancels the shot retaining, and performs a control of causing the operation character to be sent flying by a tackle by the opponent character, on the basis of the tackle-related data 106 and the ability parameter data 105. Then, the process proceeds to step S216 in FIG. 15.

In step S214, the processor 21 determines whether or not the shot retaining has been completed in a super shot possible state. Specifically, the processor 21 determines whether or not the counting of the long pressing time executed in step S209 has been completed, thereby establishing a long press, and the shot retaining (long pressing operation) of a super shot has been completed. When this determination is YES, the process proceeds to step S215, and when this determination is NO, the process returns to step S209.

Figure 18:
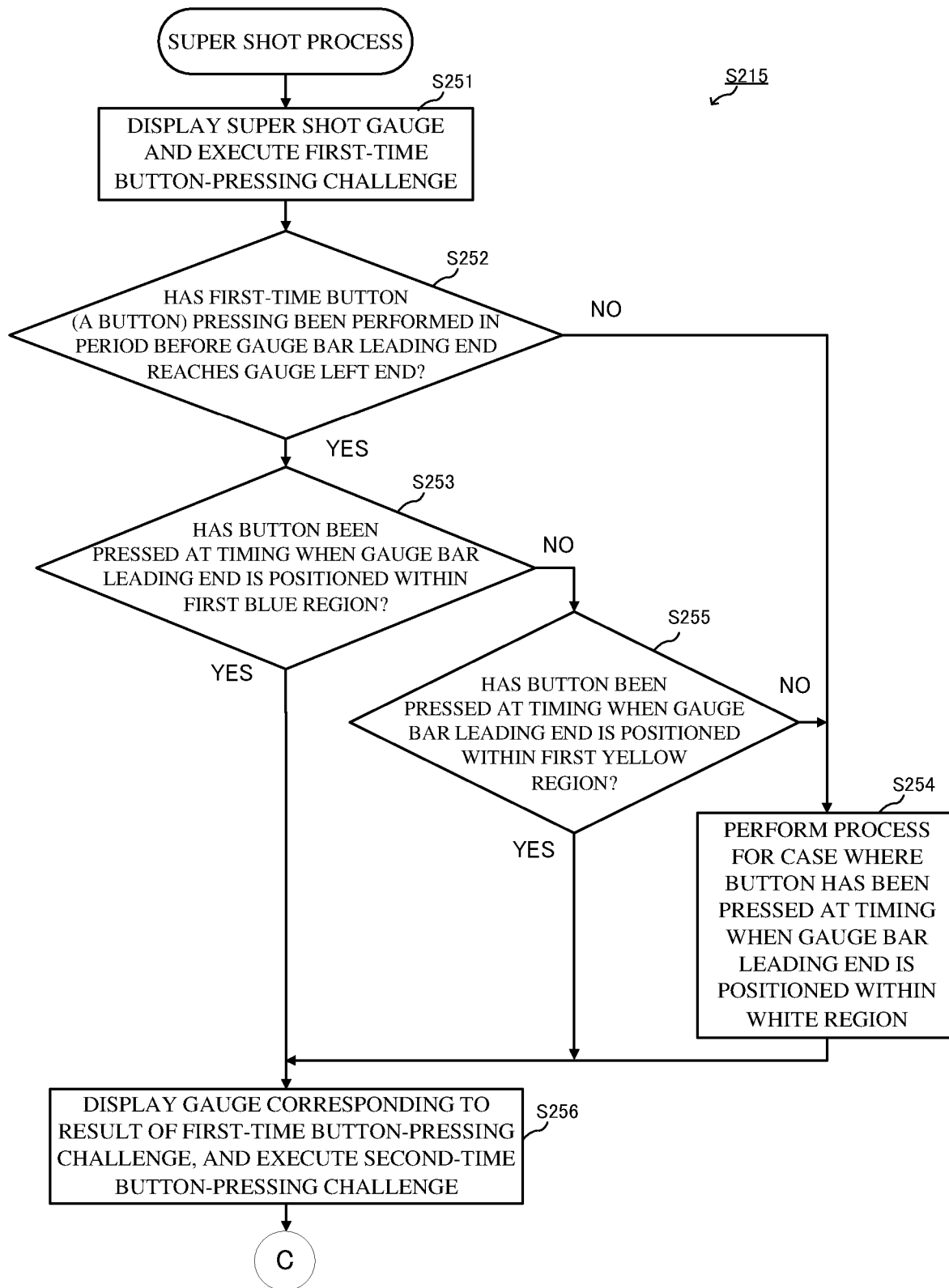
FIG. 18 is a non-limiting example of a flowchart of game processing.
Figure 19:
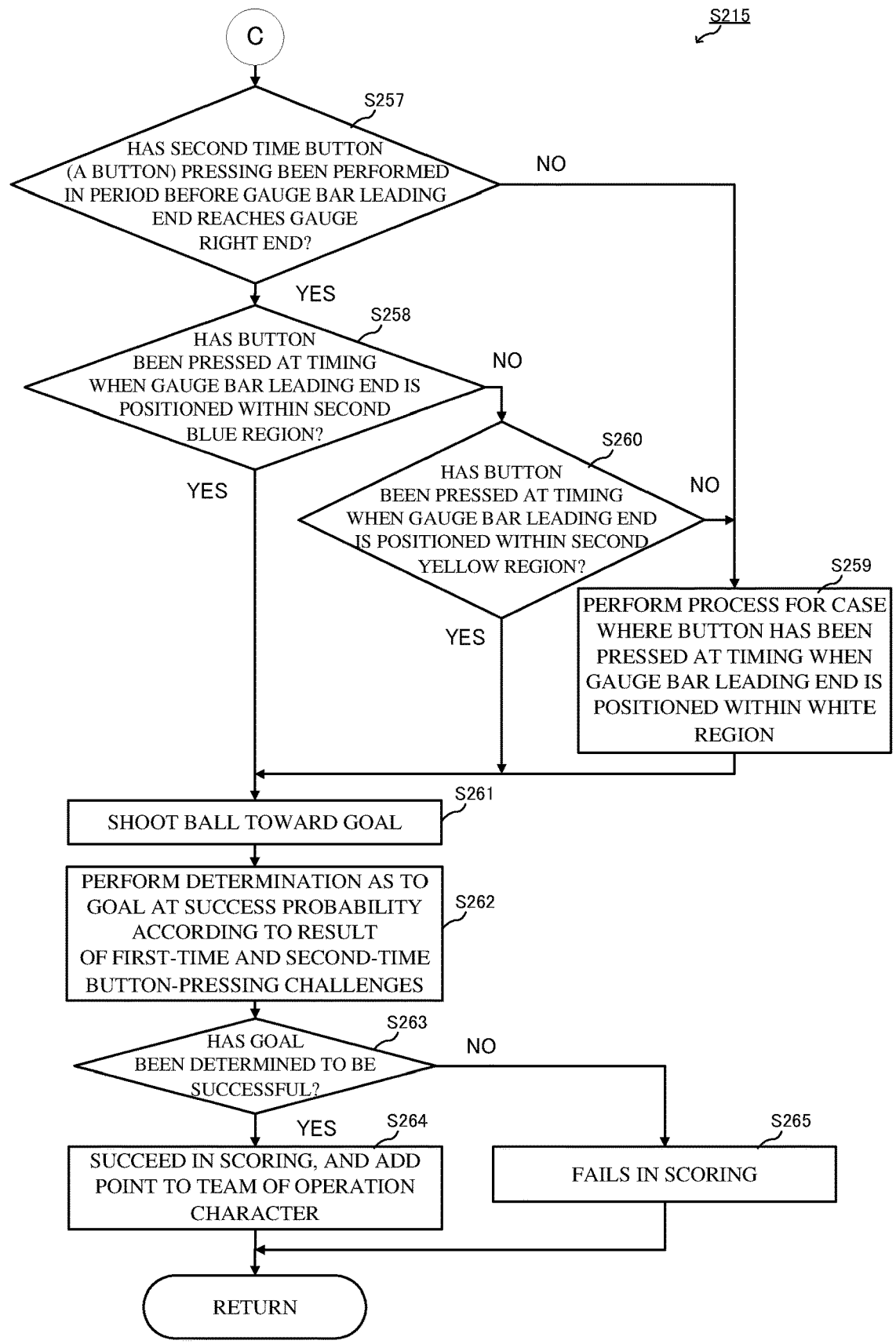
FIG. 19 is a non-limiting example of a flowchart of game processing.

In step S215, the processor 21 performs a super shot process. FIG. 18 and FIG. 19 are examples of flowcharts showing the super shot process in FIG. 16. Hereinafter, the super shot process will be described with reference to FIG. 18 and FIG. 19.

In step S251 in FIG. 18, as described with reference to (1) of FIG. 11, the processor 21 displays the super shot gauge 72 and executes a first-time button-pressing challenge for a super shot. Then, the process proceeds to step S252.

In step S252, on the basis of the operation data 110, the processor 21 determines whether or not a first-time A button pressing has been performed in a period before the gauge bar leading end Z reaches the left end Y of the super shot gauge 72. When this determination is YES, the process proceeds to step S253, and when this determination is NO, the process proceeds to step S254.

In step S253, the processor 21 determines whether or not the A button has been pressed at a timing at which the gauge bar leading end Z is positioned within the first blue region

81-1. When this determination is YES, the process proceeds to step S256, and when this determination is NO, the process proceeds to step S255.

In step S255, the processor 21 determines whether or not the A button has been pressed at a timing at which the gauge bar leading end Z is positioned within a first yellow region 82-1. When this determination is YES, the process proceeds to step S256, and when this determination is NO, the process proceeds to step S254.

In step S254, the processor 21 performs a process for a case where the A button has been pressed at a timing at which the gauge bar leading end Z is positioned within the white region 80. Then, the process proceeds to step S256.

In step S256, the processor 21 displays the super shot gauge 72 corresponding to the result of the first-time button-pressing challenge, and executes a second-time button-pressing challenge. Specifically, when having performed the process of step S256 subsequently to step S253, the processor 21 performs a display such that the area of the second blue region 81-2 is enlarged with respect to that of the first blue region 81-1, as described with reference to (3) of FIG. 11. When having performed the process of step S256 subsequently to step S254 or S255, the processor 21 performs a display such that the second blue region 81-2 and the second yellow regions 82-2 have the same shape and the same area as those of the first blue region 81-1 and the first yellow regions 82-1, as described with reference to (2) of FIG. 11. Then, the process proceeds to step S257 in FIG. 19.

In step S257 in FIG. 19, on the basis of the operation data 110, the processor 21 determines whether or not the second-time A button pressing has been performed in a period before the gauge bar leading end Z reaches the right end X of the super shot gauge 72. When this determination is YES, the process proceeds to step S258, and when this determination is NO, the process proceeds to step S259.

In step S258, the processor 21 determines whether or not the A button has been pressed at a timing at which the gauge bar leading end Z is positioned within the second blue region 81-2. When this determination is YES, the process proceeds to step S261, and when this determination is NO, the process proceeds to step S260.

In step S260, the processor 21 determines whether or not the A button has been pressed at a timing at which the gauge bar leading end Z is positioned within a second yellow region 82-2. When this determination is YES, the process proceeds to step S261, and when this determination is NO, the process proceeds to step S259.

In step S259, the processor 21 performs a process for a case where the A button has been pressed at a timing at which the gauge bar leading end Z is positioned within the white region 80. Then, the process proceeds to step S261.

In step S261, the processor 21 performs a process of causing the operation character to shoot the ball toward a goal. Then, the process proceeds to step S262.

In step S262, on the basis of the super shot success rate data 107 (see FIG. 12), the processor 21 performs determination as to a goal on the basis of a success probability corresponding to the results of the first-time and the second-time button-pressing challenges. Then, the process proceeds to step S263.

In step S263, the processor 21 determines whether or not the goal has been determined to be successful in the determination in step S262. When this determination is YES, the process proceeds to step S264, and when this determination is NO, the process proceeds to step S265.

In step S264, when a shot by the operation character has been successful and the ball has entered the goal, the processor 21 performs a process of adding a point to the team of the operation character. Then, the process proceeds to step S216 in FIG. 15.

In step S265, the processor 21 performs a process of causing a shot by the operation character to fail to score. Then, the process proceeds to step S216 in FIG. 15. This is the end of description of the super shot process.

With reference back to FIG. 15, in step S216, on the basis of the athlete character data 103 and the like, the processor 21 determines whether or not an item appearing condition has been satisfied. Specifically, when an athlete character not keeping the ball has been tackled, the processor 21 determines that the item appearing condition has been satisfied. Other than the appearing of an item based on a tackle described above, further, when an appearing condition that a predetermined time has elapsed during a match is satisfied, an item may be caused to appear in the field. Then, the process proceeds to step S217.

In step S217, the processor 21 causes an item to appear in the soccer field. Specifically, as already described, when an athlete character not keeping the ball has been tackled, the processor 21 causes an item (first item) advantageous for the team of the athlete character to appear, or when a predetermined time has elapsed, the processor 21 causes an item (second item) that can be used by characters of both of the own team and the opponent team to appear. Then, the process proceeds to step S218.

In step S218, the processor 21 executes other processes such as a process of causing a character (a non-player character such as a goalkeeper, etc.) operated by the computer, to perform a motion. Then, the match control process ends, and the process proceeds to step S300 in FIG. 14.

In step S300 in FIG. 14, the processor 21 determines whether or not a match ending condition such as a lapse of a match time has been satisfied. When this determination is YES, the process proceeds to step S400, and when this determination is NO, the process returns to step S200.

In step S400, the processor 21 performs a match ending process such as displaying a representation of the end of the match on the display section 5. Then, this game processing ends.

As described above, according to the exemplary embodiment, it is possible to perform a novel and very strategic tackle action, i.e., a team tackle in which the operation character is caused to tackle a teammate character and the teammate character that has been sent flying (thrusted away) tackles an opponent character (see FIG. 3, FIG. 6, FIG. 9, etc.).

According to the exemplary embodiment, it is possible to perform a novel and very strategic tackle action in which the operation character tackles a teammate character keeping the ball, to send the teammate character flying, thereby breaking through the defense by the opponent character (see FIG. 3, FIG. 6, FIG. 8, etc.).

According to the exemplary embodiment, in the button-pressing challenges performed two times, when the button-pressings in the blue region (81-1, 81-2) have been successful, a super shot in which the shot will be successful by 100% is performed. When the button-pressing in the first blue region 81-1 in the first-time button-pressing challenge has been successful, the second blue region 81-2 is widened (the period in which button-pressing can be performed in the second blue region 81-2 is extended) in the second-time button-pressing challenge, thereby providing an assist such that button-pressing in the blue region performed two times will be successful (see FIG. 11). Accordingly, it is possible to perform a super shot operation that is rich in variety in that the degree of difficulty of the second-time button-pressing challenge is switched between a case where the first-time button-pressing challenge has been successful and a case where first-time button-pressing challenge has failed.

When button-pressing in the first blue region 81-1 has been successful in the first-time button-pressing challenge, the second blue region 81-2 is widened but the combined size of the second blue region 81-2 and the yellow regions 82-2 is not changed in the second-time button-pressing challenge (see FIG. 11). That is, the second yellow regions 82-2 are narrowed. This can prevent the success rate of a super shot from becoming too high when button-pressing in the first blue region 81-1 has been successful in the first-time button-pressing challenge (see FIG. 12).

[Modification]

In the exemplary embodiment above, a sports game of which the concept is a soccer game has been described as an example. However, not limited thereto, a sports game of which the concept is, for example, a basketball game, an ice hockey game, an American football game, or the like, may be adopted.

In the example in the exemplary embodiment above, when the operation character has performed an ordinary tackle on an opponent character keeping the ball, the ball becomes a loose ball (see FIG. 7). However, when the operation character has performed an ordinary tackle on the opponent character keeping the ball, the operation character may take the ball or may take the ball at a predetermined probability (including a 100% probability).

In the example in the exemplary embodiment above, when a team tackle has been performed on an opponent character keeping the ball, the teammate character having performed the team tackle takes the ball (see FIG. 9). However, when a team tackle has been performed on an opponent character keeping the ball, the ball may become a loose ball, or may become a loose ball at a predetermined probability (including a 100% probability).

In the example in the exemplary embodiment above, in a team tackle, one teammate character is thrusted away. However, in a team tackle, a plurality of teammate characters may be thrusted away. Further, in a team tackle, a plurality of opponent characters may be thrusted away. Alternatively, a configuration in which, in a team tackle, a plurality of opponent character are not thrusted away (in other words, due to a team tackle, only one opponent character is thrusted away), may be adopted.

In the example in the exemplary embodiment above, the opponent character on which an ordinary tackle or a team tackle has been performed is thrusted away and stopped for a certain time (in accordance with the Physical value, etc.) (see FIG. 5 to FIG. 7, and FIG. 9). However, a configuration in which the opponent character on which an ordinary tackle or a team tackle has been performed is either thrusted away or is stopped for a certain time (in accordance with the Physical value, etc.) may be adopted. For example, a configuration in which, when the Physical value of the opponent character is small or the tackle strength is small (see FIG. 5 and FIG. 6), the opponent character is not stopped for a certain time after being thrusted away, or the opponent character is stopped for a certain time without being thrusted away, may be adopted.

In the exemplary embodiment above, a specific example in which a team tackle is performed on an opponent character keeping the ball has been described with reference to FIG. 9 and the like. However, a configuration in which, even if an ordinary tackle or a team tackle is performed on an opponent character not keeping the ball, the ordinary tackle or the team tackle is established and the opponent character is thrusted away and stopped for a certain time, may be adopted.

In the example in the exemplary embodiment above, with respect to an opponent character on which an ordinary tackle has been performed, there is a case where, when the Physical value of the opponent character is high, the opponent character is not forcibly stopped for a certain time (see description regarding FIG. 5 and FIG. 7). However, a configuration in which, irrespective of the Physical value of the opponent character, the opponent character is forcibly stopped for some time, and the higher the Physical value of the opponent character is, the shorter the time of the forcible stop is, may be adopted. It should be noted that, with respect to the opponent character on which an ordinary tackle has been performed, similar to a modification of a team tackle below, a configuration in which, irrespective of the Physical value of the opponent character, the opponent character is forcibly stopped for a certain time without fail, may be adopted.

In the example in the exemplary embodiment above, with respect to an opponent character on which a team tackle has been performed, there is a case where, when the Physical value of the opponent character is high, the opponent character is not forcibly stopped for a certain time (see description regarding FIG. 6 and FIG. 9). However, a configuration in which, irrespective of the Physical value of the opponent character, the opponent character is forcibly stopped for a certain time without fail, may be adopted. It should be noted that, with respect to the opponent character on which a team tackle has been performed, similar to the modification of an ordinary tackle above, a configuration in which, irrespective of the Physical value of the opponent character, the opponent character is forcibly stopped for some time, and the higher the Physical value of the opponent character, the shorter the time of the forcible stop is, may be adopted.

In the exemplary embodiment above, in a period (i.e., in a period in which tackle retaining is being performed) in which a display in which the tackle gauge 70 is being filled (charged) is performed, the moving speed of the operation character may be decreased. This allows the user to take a necessary timing for the tackle into consideration, and thus, a more strategic sports game can be realized.

In the super shot in the exemplary embodiment above, the action of a super shot performed by the operation character may be changed in accordance with the results of button-pressing challenges performed two times (see FIG. 12). Further, when the results of the button-pressing challenges performed two times is "blue blue", an action of a special super shot suggesting that the goal success rate is 100% may be performed.

In the example in the exemplary embodiment above, in the super shot gauge 72 regarding a super shot, the yellow regions (82-1, 82-2) are provided on both sides of the blue region (81-1, 81-2) (see FIG. 11). However, in the super shot gauge 72 regarding a super shot, at at least one side of the blue region (81-1, 81-2), the yellow region (82-1, 82-2) may be provided.

In the example in the exemplary embodiment above, a sports game of which the concept is a soccer game has been described. However, not limited to a sports game of which the concept is a soccer game, the contents described with reference to FIG. 11 can be applied to a sports game of which the concept is, for example, a basketball game, a baseball game, an ice hockey game, an American football game, a golf game, a tennis game, a volleyball game, an archery game, or the like.

In the exemplary embodiment above, a case in which a series of processes regarding the game processing are executed in a single game apparatus 2 has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the game apparatus 2 sends operation data indicating operations performed by the user to a predetermined server; various game processes are executed in the server; and the execution result is streaming-distributed as a moving image/sound to the game apparatus 2.

While the exemplary embodiment has been described in detail, the foregoing description is in all aspects illustrative and not restrictive. It is to be understood that various modifications and variations can be made without departing from the scope of the exemplary embodiment.

What is claimed is:

1. A non-transitory computer-readable storage medium having stored therein instructions that, when executed by a processor of an information processing apparatus that executes a competitive sports game in which a character belonging to a first team and being an operation target of a user, and a character belonging to a second team of a competitive opponent are controlled in a virtual space so as to put a predetermined object into a goal, cause the information processing apparatus to:
   on the basis of an operation input by the user, perform an action occurrence process of causing an operation character belonging to the first team to perform a predetermined action;
   when, due to the predetermined action, the operation character has collided with an opponent character belonging to the second team, perform a first collision process of stopping the opponent character or moving the opponent character in a collision direction;
   when, due to the predetermined action, the operation character has collided with a teammate character belonging to the first team, perform a second collision process of moving the teammate character in a collision direction; and
   when, due to the second collision process, the teammate character having been moved in the collision direction has further collided with the opponent character, perform a third collision process of stopping the opponent character or moving the opponent character in a collision direction.

2. The storage medium according to claim 1, wherein the instructions cause the information processing apparatus to
   when, in the first collision process, due to the predetermined action, the operation character has collided with the opponent character possessing the predetermined object, cause the operation character to take the predetermined object from the opponent character, or cause the opponent character to cancel the possession of the predetermined object.

3. The storage medium according to claim 1, wherein the instructions cause the information processing apparatus to
   when, in the third collision process, due to the predetermined action, the teammate character has collided with the opponent character possessing the predetermined object, cause the teammate character to take the predetermined object from the opponent character, or cause the opponent character to cancel the possession of the predetermined object.

4. The storage medium according to claim 1, wherein the instructions cause the information processing apparatus to
   when, in the second collision process, due to the predetermined action, the operation character has collided with the teammate character possessing the predetermined object, move the teammate character in the collision direction, with an additional movement speed applied to the teammate character.

5. The storage medium according to claim 1, wherein the instructions cause the information processing apparatus to
   when, in the first collision process, the operation character has collided with the opponent character not possessing the predetermined object, or when, in the third collision process, the teammate character moving in the collision direction has collided with the opponent character not possessing the predetermined object, cause a first item advantageous for the second team to appear in the virtual space.

6. The storage medium according to claim 5, wherein the instructions cause the information processing apparatus to
   cause a second item usable by both of the first team and the second team to appear in the virtual space.

7. The storage medium according to claim 1, wherein the instructions cause the information processing apparatus to:
   during the competitive sports game, in accordance with an ability parameter set to each character belonging to the first team and each character belonging to the second team, control the character belonging to the first team and the character belonging to the second team; and
   in the first collision process or the third collision process, in accordance with at least the ability parameter of the opponent character, determine whether to stop the opponent character or move the opponent character in a collision direction.

8. The storage medium according to claim 7, wherein the ability parameter is different for each character belonging to the first team and for each character belonging to the second team.

9. The storage medium according to claim 7, wherein the instructions cause the information processing apparatus to
   on the basis of an operation input by the user, cause the opponent character to be equipped with an equipment item that changes the ability parameter.

10. The storage medium according to claim 7, wherein the instructions cause the information processing apparatus to
when, in the first collision process or the third collision process, the opponent character is moved in the collision direction, move the opponent character in the collision direction by a movement distance according to the ability parameter.

11. The storage medium according to claim 1, wherein the instructions cause the information processing apparatus to:
in the predetermined action, determine a strength of collision to be applied by the operation character to the teammate character or the opponent character, in accordance with a retaining degree of a first retaining input based on an operation input by the user; and
when, in the first collision process, the operation character has collided with the opponent character or when, in the second collision process, the operation character has collided with the teammate character, move the opponent character or the teammate character in the collision direction by a movement distance according to the retaining degree of the first retaining input.

12. The storage medium according to claim 11, wherein the instructions cause the information processing apparatus to
while the first retaining input is performed,
generate a game image including a first gauge that indicates a degree of the first retaining input and a direction in which the operation character collides with the opponent character or the teammate character in the predetermined action.

13. The storage medium according to claim 11, wherein the instructions cause the information processing apparatus to
in the predetermined action, further move the operation character on the basis of an operation input by the user, while the first retaining input is performed.

14. The storage medium according to claim 1, wherein the instructions further cause the information processing apparatus to:
on the basis of an operation input by the user, perform a shooting action occurrence process of causing the operation character to perform shooting of the predetermined object toward the goal;
in the shooting action occurrence process, determine a strength of the shooting in accordance with a degree of a second retaining input based on an operation input by the user; and
while the second retaining input is performed, generate a game image including a second gauge indicating the degree of the second retaining input.

15. A game processing system in which a competitive sports game in which a character belonging to a first team and being an operation target of a user, and a character belonging to a second team of a competitive opponent are controlled in a virtual space so as to put a predetermined object into a goal, is executed,
the game processing system comprising
a processor and a memory coupled thereto, the processor being configured to control the game processing system to at least:
on the basis of an operation input by the user, perform an action occurrence process of causing an operation character belonging to the first team to perform a predetermined action;
when, due to the predetermined action, the operation character has collided with an opponent character belonging to the second team, perform a first collision process of stopping the opponent character or moving the opponent character in a collision direction;
when, due to the predetermined action, the operation character has collided with a teammate character belonging to the first team, perform a second collision process of moving the teammate character in a collision direction; and
when, due to the second collision process, the teammate character having been moved in the collision direction has further collided with the opponent character, perform a third collision process of stopping the opponent character or moving the opponent character in a collision direction.

16. The game processing system according to claim 15, wherein
the processor causes the game processing system to
when, in the first collision process, due to the predetermined action, the operation character has collided with the opponent character possessing the predetermined object, cause the operation character to take the predetermined object from the opponent character, or cause the opponent character to cancel the possessing of the predetermined object.

17. The game processing system according to claim 15, wherein
the processor causes the game processing system to
when, in the third collision process, due to the predetermined action, the teammate character has collided with the opponent character possessing the predetermined object, cause the teammate character to take the predetermined object from the opponent character, or cause the opponent character to cancel the possessing of the predetermined object.

18. The game processing system according to claim 15, wherein
the processor causes the game processing system to
when, in the second collision process, due to the predetermined action, the operation character has collided with the teammate character possessing the predetermined object, move the teammate character in the collision direction, with an additional movement speed applied to the teammate character.

19. The game processing system according to claim 15, wherein
the processor causes the game processing system to
when, in the first collision process, the operation character has collided with the opponent character not possessing the predetermined object, or when, in the third collision process, the teammate character moving in the collision direction has collided with the opponent character not possessing the predetermined object, cause a first item advantageous for the second team to appear in the virtual space.

20. The game processing system according to claim 19, wherein
the processor causes the game processing system to
cause a second item usable by both of the first team and the second team to appear in the virtual space.

21. The game processing system according to claim 15, wherein
the processor causes the game processing system to:
during the competitive sports game, in accordance with an ability parameter set to each character belonging to the first team and each character belonging to the second team, control the character belonging to the first team and the character belonging to the second team; and in the first collision process or the third collision process, in accordance with at least the ability parameter of the opponent character, determine whether to stop the opponent character or move the opponent character in a collision direction.

22. The game processing system according to claim 21, wherein the ability parameter is different for each character belonging to the first team and for each character belonging to the second team.

23. The game processing system according to claim 21, wherein the processor causes the game processing system to
on the basis of an operation input by the user, cause the opponent character to be equipped with an equipment item that changes the ability parameter.

24. The game processing system according to claim 21, wherein the processor causes the game processing system to
when, in the first collision process or the third collision process, the opponent character is moved in the collision direction, move the opponent character in the collision direction by a movement distance according to the ability parameter.

25. The game processing system according to claim 15, wherein the processor causes the game processing system to:
in the predetermined action, determine a strength of collision to be applied by the operation character to the teammate character or the opponent character, in accordance with a retaining degree of a first retaining input based on an operation input by the user; and
when, in the first collision process, the operation character has collided with the opponent character or when, in the second collision process, the operation character has collided with the teammate character, move the opponent character or the teammate character in the collision direction by a movement distance according to the retaining degree of the first retaining input.

26. The game processing system according to claim 25, wherein the processor causes the game processing system to
while the first retaining input is performed,
generate a game image including a first gauge that indicates a degree of the first retaining input and a direction in which the operation character collides with the opponent character or the teammate character in the predetermined action.

27. The game processing system according to claim 25, wherein the processor causes the game processing system to
in the predetermined action, further move the operation character on the basis of an operation input by the user, while the first retaining input is performed.

28. The game processing system according to claim 15, wherein the processor further causes the game processing system to:
on the basis of an operation input by the user, perform a shooting action occurrence process of causing the operation character to perform shooting of the predetermined object toward the goal;
in the shooting action occurrence process, determine a strength of the shooting in accordance with a degree of a second retaining input based on an operation input by the user; and
while the second retaining input is performed, generate a game image including a second gauge indicating the degree of the second retaining input.

29. A game processing apparatus configured to execute a competitive sports game in which a character belonging to a first team and being an operation target of a user, and a character belonging to a second team of a competitive opponent are controlled in a virtual space so as to put a predetermined object into a goal, the game processing apparatus comprising
a processor and a memory coupled thereto, the processor being configured to control the game processing apparatus to at least:
on the basis of an operation input by the user, perform an action occurrence process of causing an operation character belonging to the first team to perform a predetermined action;
when, due to the predetermined action, the operation character has collided with an opponent character belonging to the second team, perform a first collision process of stopping the opponent character or moving the opponent character in a collision direction;
when, due to the predetermined action, the operation character has collided with a teammate character belonging to the first team, perform a second collision process of moving the teammate character in a collision direction; and
when, due to the second collision process, the teammate character having been moved in the collision direction has further collided with the opponent character, perform a third collision process of stopping the opponent character or moving the opponent character in a collision direction.

30. A game processing method executed by a computer configured to control a game processing system in which a competitive sports game in which a character belonging to a first team and being an operation target of a user, and a character belonging to a second team of a competitive opponent are controlled in a virtual space so as to put a predetermined object into a goal, is executed, the game processing method causing the game processing system to:
on the basis of an operation input by the user, perform an action occurrence process of causing an operation character belonging to the first team to perform a predetermined action;
when, due to the predetermined action, the operation character has collided with an opponent character belonging to the second team, perform a first collision process of stopping the opponent character or moving the opponent character in a collision direction;
when, due to the predetermined action, the operation character has collided with a teammate character belonging to the first team, perform a second collision process of moving the teammate character in a collision direction; and
when, due to the second collision process, the teammate character having been moved in the collision direction has further collided with the opponent character, perform a third collision process of stopping the opponent character or moving the opponent character in a collision direction.

* * * * *